FLOATING POINT SYSTEM: SINGLE AND DOUBLE PRECISION CONVERSIONS

Filed Oct. 5, 1965 7 Sheets-Sheet 1

INVENTORS
GERALD J. ERICKSON
THOMAS C. TOLLEFSON
BY Charles A. Johnson
ATTORNEY

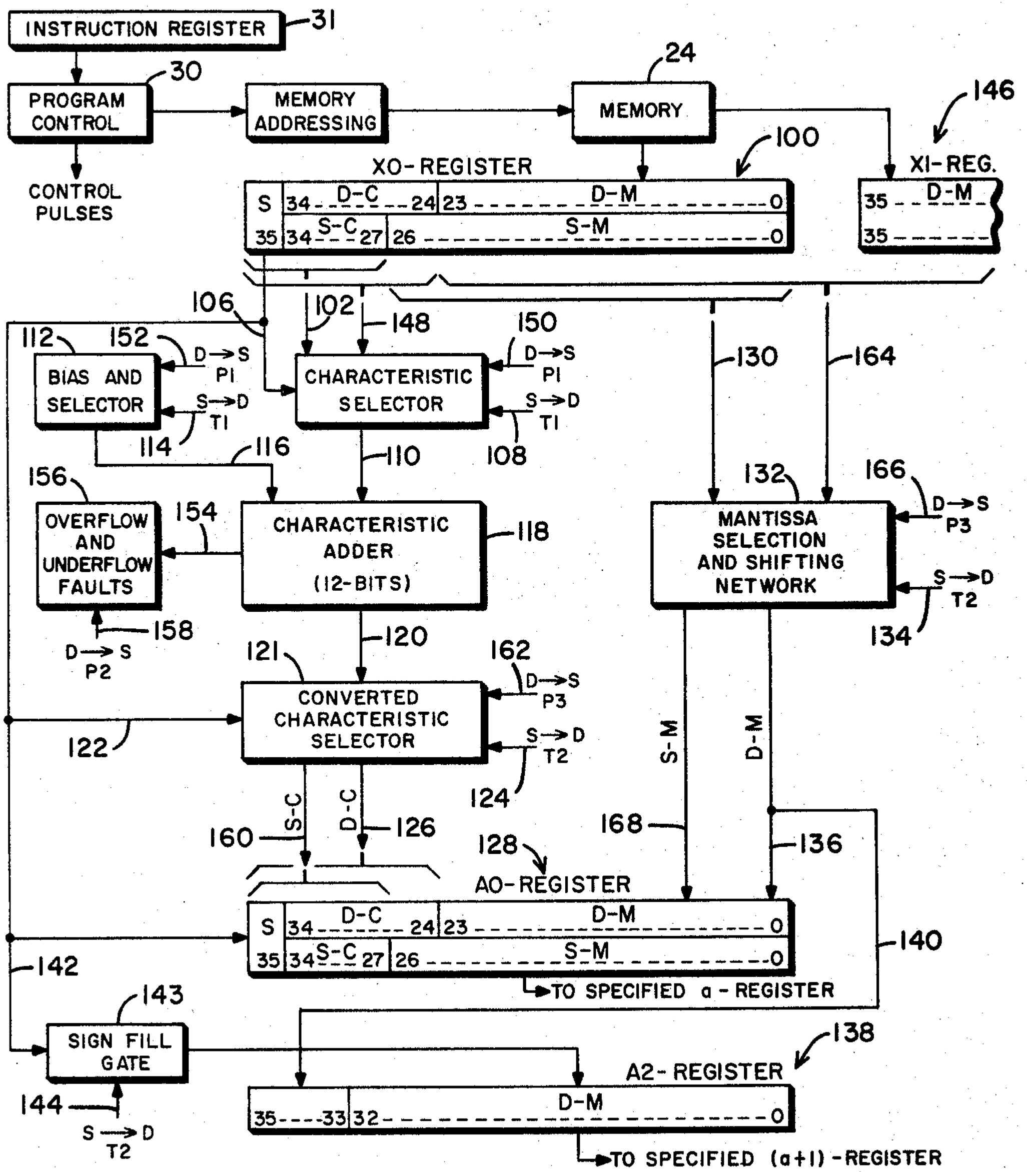
Fig. 7
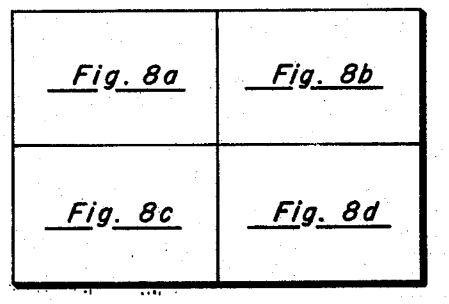
Fig. 8a Fig. 8b Fig. 8c Fig. 8d
Fig. 8

FLOATING POINT SYSTEM: SINGLE AND DOUBLE PRECISION CONVERSIONS

Filed Oct. 5, 1965 7 Sheets-Sheet 6

3,389,379

FLOATING POINT SYSTEM: SINGLE AND DOUBLE PRECISION CONVERSIONS

Gerald J. Erickson and Thomas C. Tollefson, St. Paul, Minn., assignors to Sperry Rand Corporation, New York, N.Y., a corporation of Delaware Filed Oct. 5, 1965, Ser. No. 493,150
16 Claims. (Cl. 340—172.5)

ABSTRACT OF THE DISCLOSURE

Conversion circuitry for converting single-precision floating point operands to double-precision floating point operands, and circuitry for converting double-precision floating point operands to single-precision floating point operands are described. Circuitry for converting the numerical capacity of a biased floating point characteristic to a different biased numerical capacity is also described.

Figure 1:
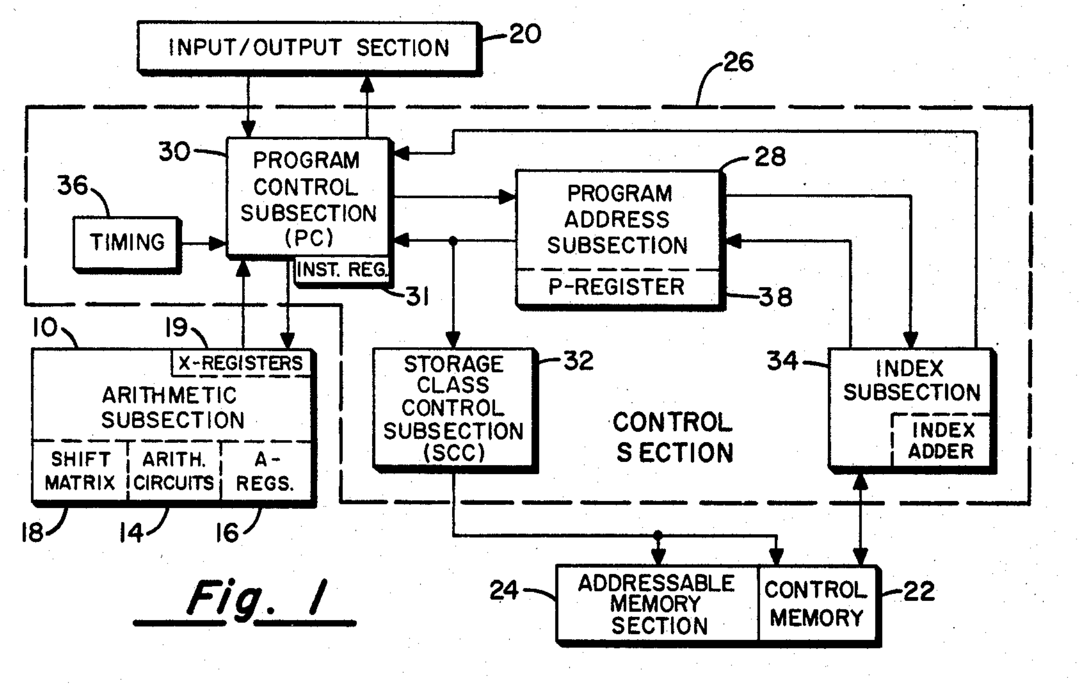

This invention relates to computing devices and more particularly to conversion circuits for use in arithmetic sections of computing devices which operate on data in so-called single-precision floating-point format and double-precision floating-point format.

In computing devices employing floating-point arithmetic capability the data or operand upon which arithmetic functions are to be performed are in a format such that one portion of the data word contains the actual information and is called the mantissa, whereas another portion of the data word contains the characteristic. The characteristic is used primarily to indicate the relative position of the arithmetic point, such as decimal or binary point, in the information or data contained in the mantissa. In performing arithmetic operations on data in the floating-point format, the actual arithmetic operations are performed on the information contained in the mantissa portion of the data word and the characteristic is used primarily to indicate relative position of the arithmetic point in the information. Some arithmetic operations are performed on the characteristic portion to determine the characteristic of the result of the arithmetic operation on the mantissa. For example, in adding two operands in floating-point format, each having its own characteristic and its own mantissa portions, the arithmetic section of a computing device utilizes the two characteristics to determine the actual digit-by-digit alignment, i.e., to properly align the arithmetic points, of the two mantissas which are to be added. In the adder portion of the computing device the two aligned mantissas are then added together to produce a resulting floating-point sum. To preserve a floating-point format the sum of the addition of the mantissa is arranged to be a mantissa of a new floating-point data word. The characteristic of the sum is determined from the original two characteristics and additionally by any modification that might have resulted from addition of the two mantissas.

In computing devices the data words or operands are transferred and processed via a plurality of multi-staged registers. Each stage of the register represents a power of the arbitrarily designated radix of the register, and the modulus of the register is the radix raised to the power equal to the number of stages in the register. For example, in a binary computing device using the "1's" complement notation, a six stage register has a modulus $2^6$ with the lowest digit order stage or least significant stage of the register containing a signal representation of the binary multiple of $2^0$, the signal representation in the second lowest digit stage indicating a binary multiple $2^1$ and so on up to the highest digit order or most significant stage of the register indicates a binary multiple of $2^5$. For use with operands in floating-point format the registers must comprise a number of stages for holding a signal representation of the mantissa portion of the data word and additional number of stages for holding the signal representation of the characteristic portion of the data word. Although the entire operand is contained in a single register in the single-precision format, the portion devoted to the mantissa is independent of that portion which contains the characteristic so that each portion of the word can be handled substantially as independent entities. In addition to stages containing the mantissa and the characteristic, the register has an additional stage to indicate the sign of the mantissa, that is, whether the mantissa is negative or positive.

For practical reasons, the size of registers utilizing computing devices normally are limited. The choice of size is arbitrary with the word size varying considerably from one computing device to another. Normally, the register size is chosen to be similar to that capacity of the memory registers. For instance, if the memory registers are adapted to store 36 binary digits, it is quite common for the registers in the arithmetic sections to operate on 36 binary digits. When floating-point operations are performed on the characteristic-mantissa arrangement within a single register, it is referred to as single-precision floating-point. An alternative mode of operation exists wherein two word-size registers are effectively placed end-to-end, whereby the characteristic-mantissa operand can be stored in the double length register as a single entity. This mode of operation is normally referred to as double-precision floating-point due to the additional register capacity over that available for single-precision operation. It is of course evident that the larger the number of binary digits in the mantissa, the greater the degree of accuracy of the computations performed thereon.

Many computing systems of the present day utilize both a single-precision and a double-precision floating-point computational capacity. In the past it has been customary to provide the same numerical capacity for the characteristics of the single- and double-precision floating-point operand. Conversion from single-precision to double-precision, where the characteristic is of the same numerical capacity is quite readily accomplished. The drawback to such an arrangement is that the full capacity of the double-precision floating-point operation cannot normally be utilized with a characteristic limited to the capacity of a single-precision floating-point operand. Accordingly, it is desirable that the characteristic for the double-precision floating-point operand be substantially larger, or of a greater numerical capacity, than that of the single-precision floating-point format. When it is desired to change the mode of computation from single- to double-precision or from double- to single-precision where the characteristic capacities are not equal, considerable problems have been encountered in programming the conversion. For a programmed conversion, it is necessary to have a sequence of computer instructions for converting from single-precision to double-precision floating-point and a separate sequence of instructions to be performed when the conversion is from double-precision to single-precision floating-point. These sequences of instructions must be stored in the memory section and utilize several addressable memory locations. Normally, a good deal of arithmetic evaluation of the floating-point operand is necessary to perform the conversion, hence these conversion programs may be quite lengthy. This results in an inefficient use of the computer's computation capacity and is wasteful of the storage facilities necessary for storing these conversion programs. Accordingly, it is desirable and advantageous to provide for an improved apparatus for performing a conversion from single-precision to double-precision and from double-precision to single-precision floating-point operands in a single instruction execution time. Such conversion instruction can be stored in the worker program at the point where conversion is desired and can be accomplished without wasting the formerly needed time for the performance of the conversion programs. Such an arrangement increases the computational rate by performing the conversion in a single instruction time. The plurality of instruction execution times required for the conversion programs are thus eliminated. Further, these conversion instructions do not waste the utilization of the computer's memory locations formerly required for storing the conversion programs.

In the subject invention the foregoing described advantageous operation is achieved by providing a special computer instruction for converting a single-precision floating-point operand to a double-precision floating-point operand wherein the characteristic portion is evaluated with regard to the accompanying sign of the mantissa portion and is arithmetically adjusted to the capacity of the double-precision floating-point characteristic. The mantissa portion of the single-precision floating-point operand is shifted downward in the bit significant order of the register for storing the double-precision floating-point operand and the remainder of the lower ordered significant portion of the double-precision floating-point operand is filled with the sign bit of the mantissa. The arithmetic adjustment of the single-precision characteristic takes into account the difference in biasing (to be described below) of the single- and double-precision systems. The instruction for performing the double-precision to single-precision conversion can only accurately be utilized when the value of the characteristic can be expressed in the number of digit positions available in the single-precision floating-point operand. Assuming that this requirement is met, the conversion instruction operates to arithmetically adjust the double-precision characteristic by altering the bias value and by evaluating the arithmetic sign for the double-precision mantissa and compacting the double-precision characteristic into the number of bit locations available for a single-precision characteristic. The higher order portions of the double-precision mantissa portion are shifted into the lower ordered portion of the register which is utilized for storing the single-precision floating-point operand. Those bit positions in the double-precision mantissa which cannot be contained in a single-precision floating-point operand are dropped. By selectively utilizing one or the other of these conversion instructions the computational rate is materially increased and the utilization of the memory capacity is maximized.

Figure 2:
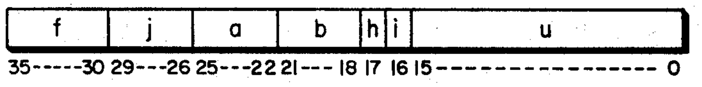
Figure 3:
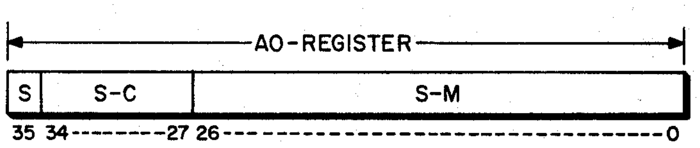
Figure 4:
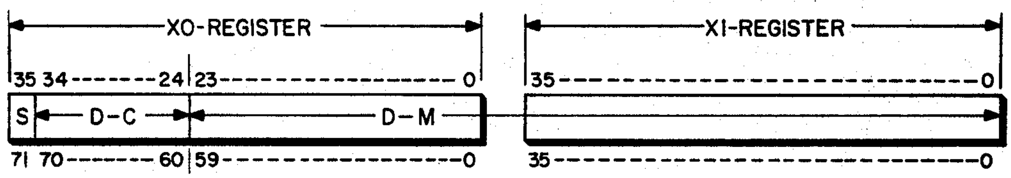
Figure 5:
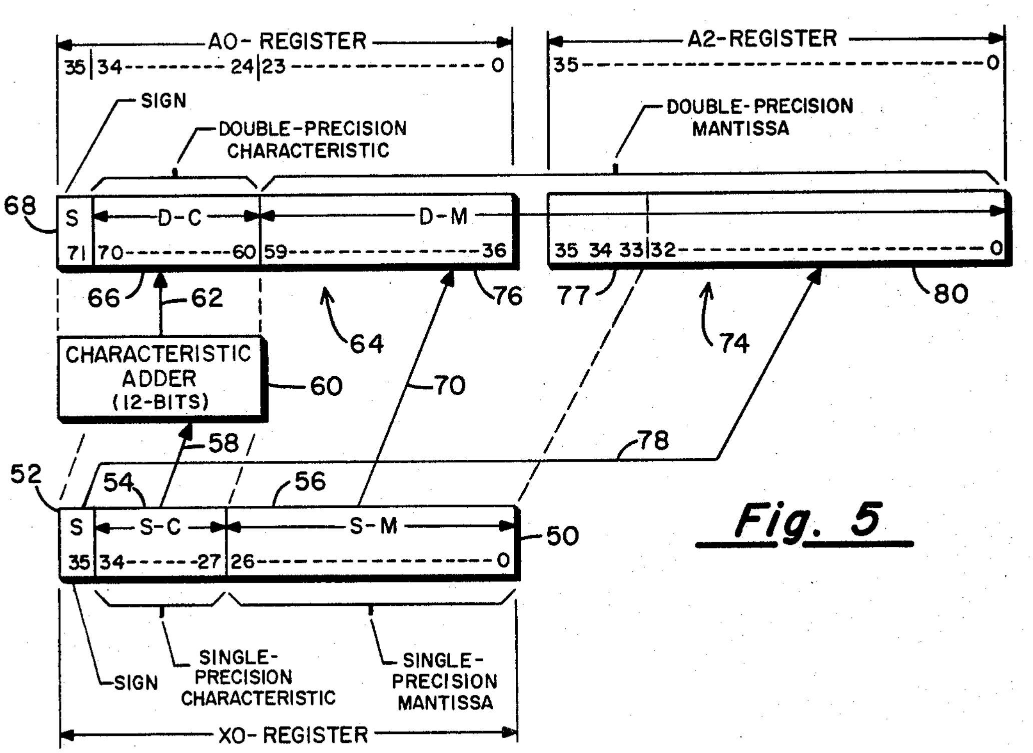
Figure 6:
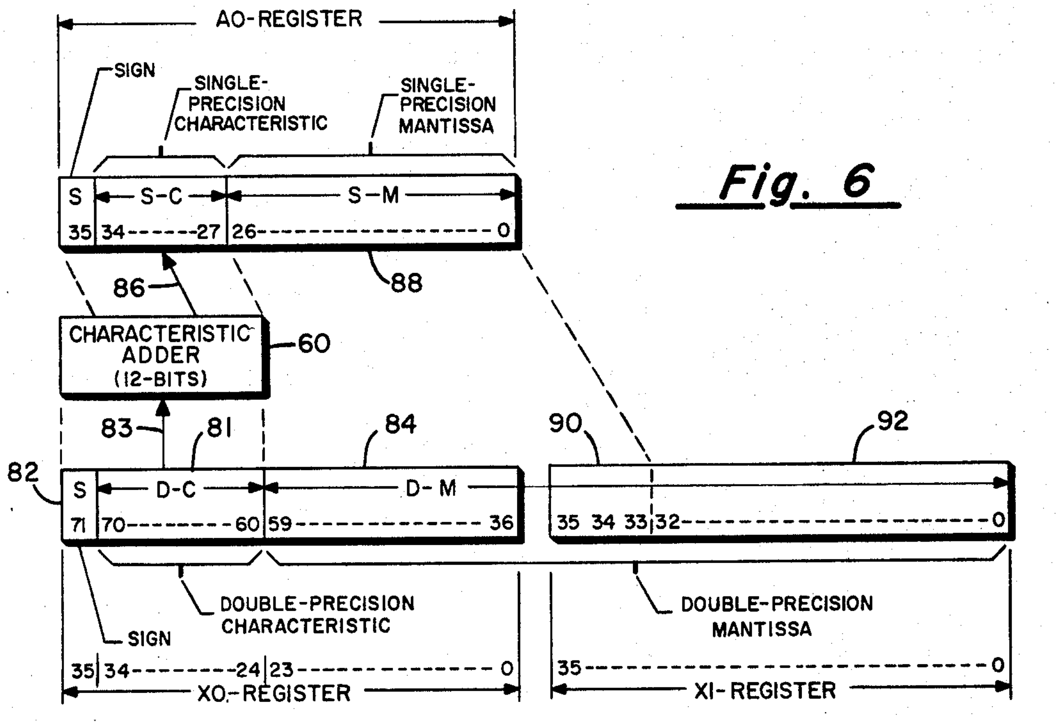
Figure 8A:
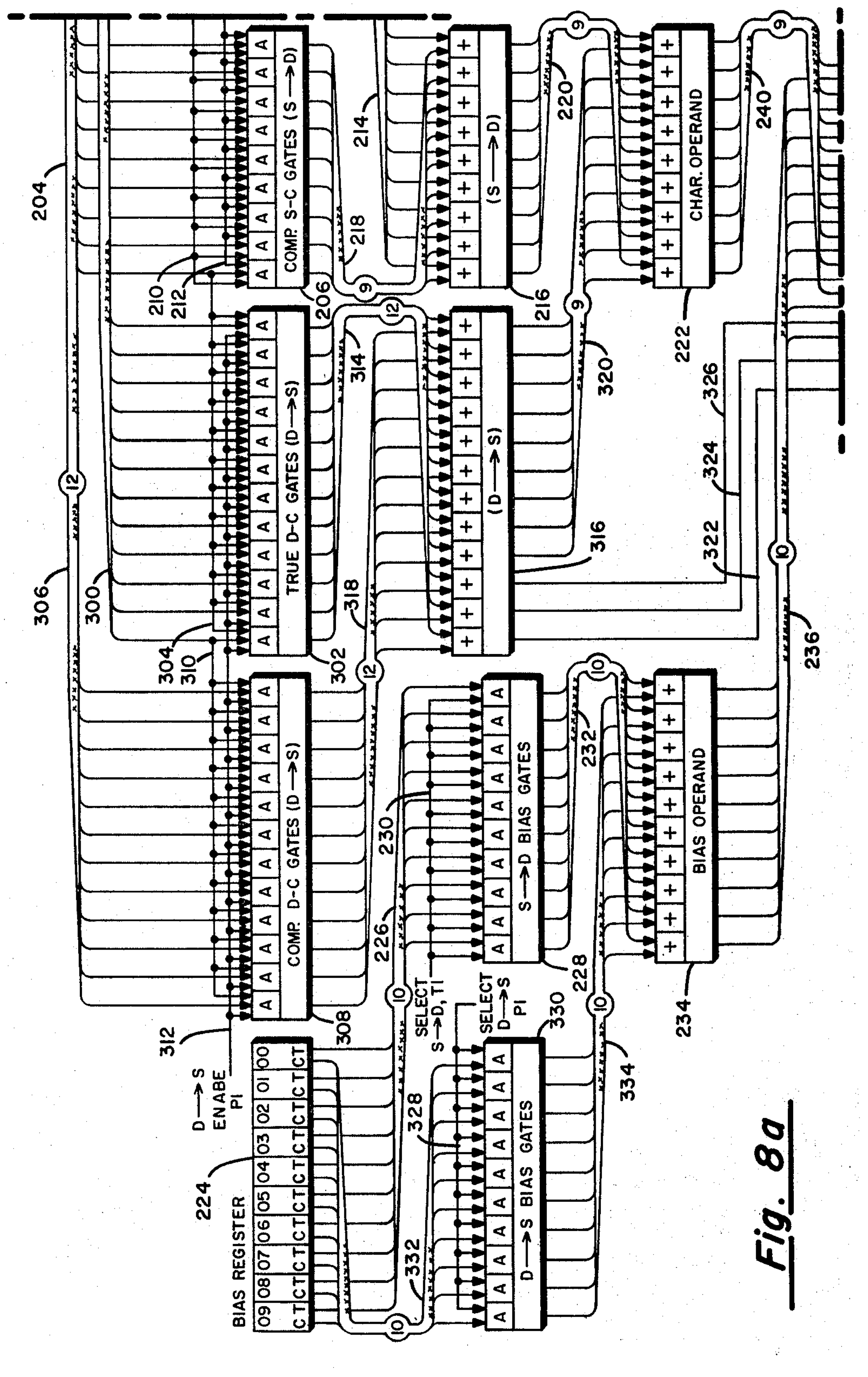
Figure 8B:
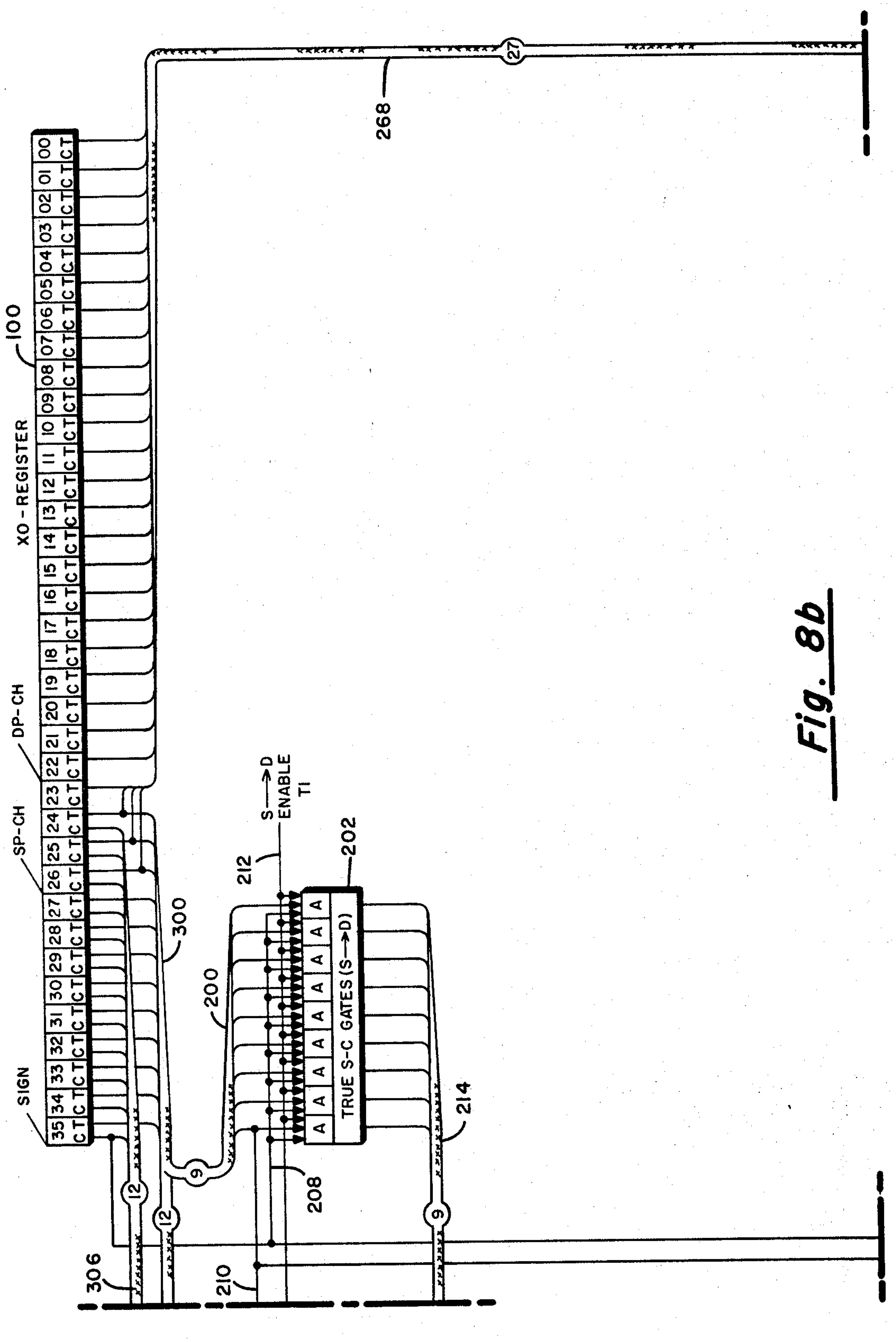
Figure 8C:
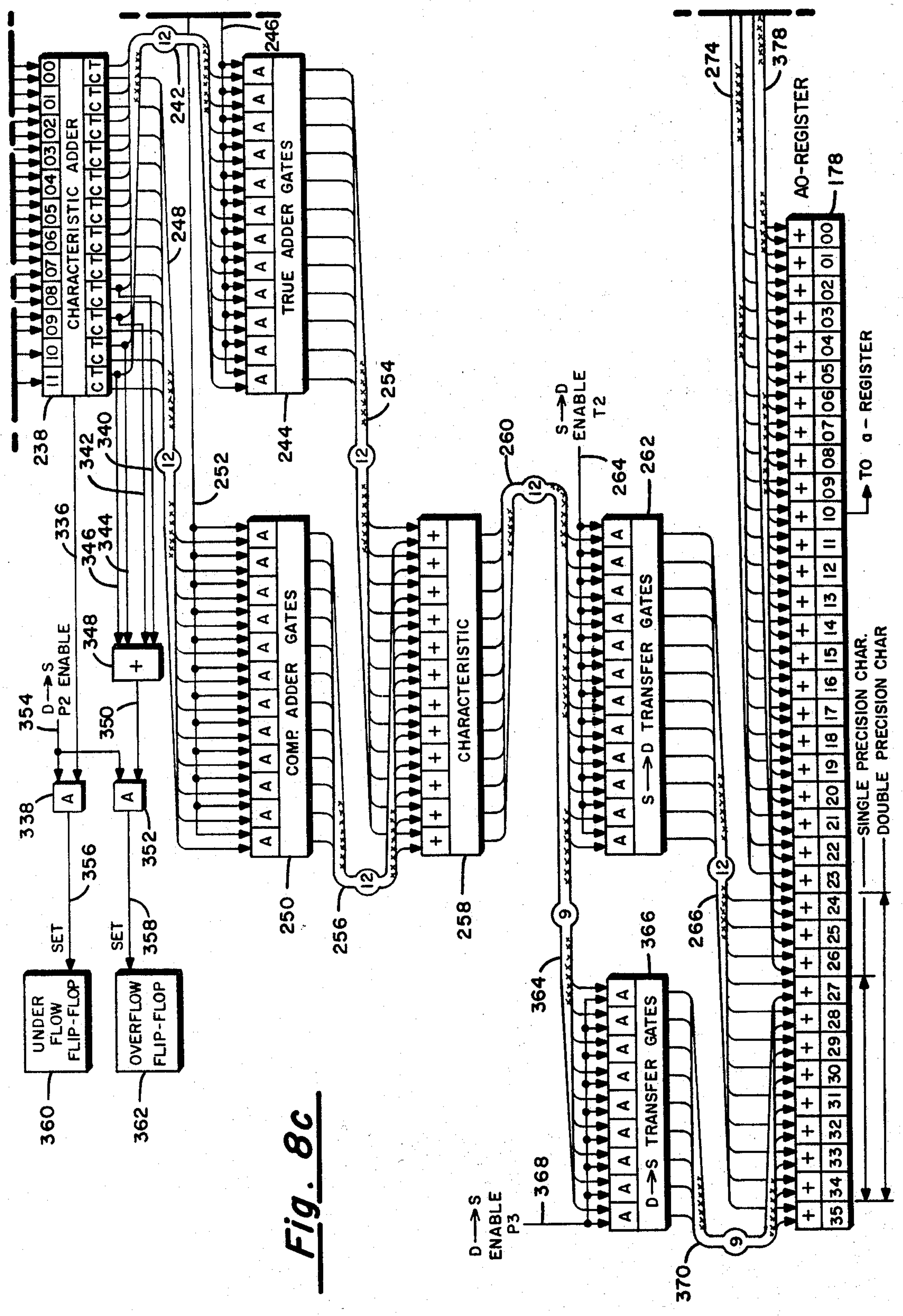
Figure 8D:
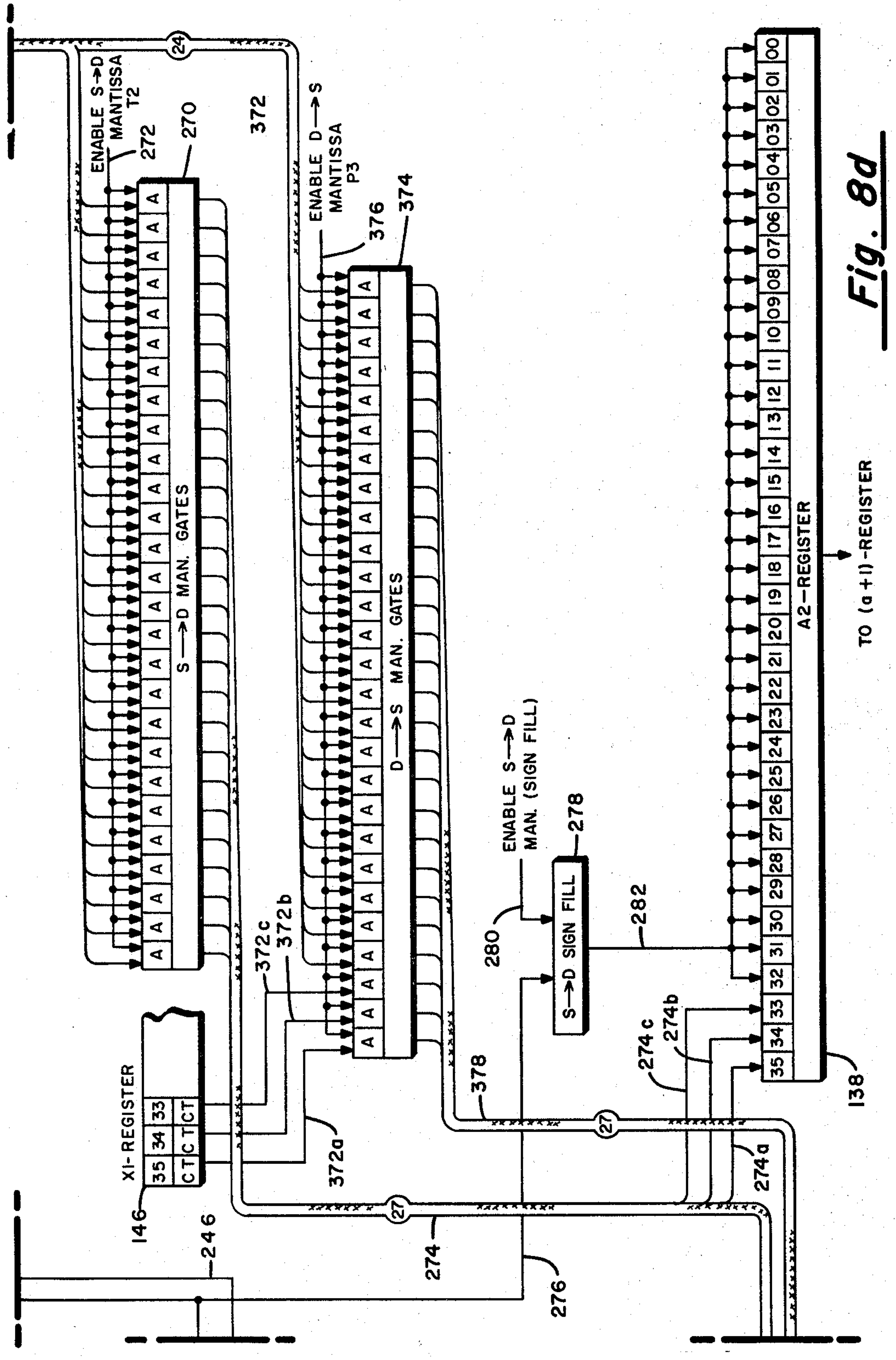

The foregoing aspects of the subject invention are illustrated in detail in the drawings, wherein: FIGURE 1 is a block diagram of a computer utilizing the single- and double-precision floating-point conversion instructions of the subject invention; FIGURE 2 illustrates the instruction word format; FIGURE 3 illustrates the single-precision floating-point operand format; FIGURE 4 illustrates the double-precision floating-point operand format; FIGURE 5 illustrates the single-precision floating-point to double-precision floating-point conversion operation; FIGURE 6 illustrates the double-precision floating-point to single-precision floating-point conversion operation; FIGURE 7 is a simplified logic diagram of an embodiment of the subject invention; and FIGURE 8 illustrates the arrangement of FIGURES 8*a* through 8*d*, which collectively are logic block diagrams of the conversion apparatus of the subject invention.

FIGURE 1 is a generalized block diagram of a computer incorporating the subject invention and illustrates the functional relationship of the various computer components. The lines with arrowheads indicate direction of flow of data or flow of control. The Arithmetic Section 10 does all the actual computations such as addition, subtraction, multiplication, and division. These arithmetic processes can be performed in either the fixed or floating-point computational modes. The Arithmetic Section also performs certain logical functions such as shifting and comparing. In addition to the Arithmetic Circuits 14, the Arithmetic Section 10 includes a plurality of A-Registers, collectively designated 16, to provide intermediate storage for arithmetic operands and results. The A0-Register and the A2-Register are of interest to the subject invention. The adder which is included in the Arithmetic Circuits 14 is a 36-bit 1's complement subtractive adder (mod $2^{36}-1$). During the execution of an arithmetic instruction, temporary internal storage registers (A-Registers 16) within the Arithmetic Section 10 itself are used for the actual computation. The computer first determines that the Arithmetic Section will be used in a given command. Data is transferred automatically from the Program Control Section (to be described below) into the X-Register subsection 19. A plurality of X-Registers are included. The data is transferred from the X-Register Subsection into an internal storage register in the arithmetic section, such as one of the A-Registers 16. Once the arithmetic operation has been completed, the results are returned via the X-Register Subsection 19 to another one of the A-Registers 16 or into control memory 22. The X-Register Subsection and the internal storage registers cannot be addressed, and for all practical purposes, the A-Registers 16 are treated as accumulators. The Arithmetic Section has the capability of handling partial words. By appropriate selection in the instruction format, the Arithmetic Section 10 is capable of handling whole words, half-word portions, third-word portions, or sixth-word portions, thereby greatly minimizing the amount of shifting operations or logical masking operations in a given program. The Arithmetic Section 10 also includes a Shift Matrix 18 for completing the shifting of up to twice the operand word length in a single instruction cycle. Only the portion of the Arithmetic Section 10 which relates to the subject invention will be described in further detail.

The Input/Output Section 20 provides the digital computer with the capability of communicating bidirectionally with peripheral units.

The Memory Section of the computer provides data storage facility constantly required by the computer as it performs its computation. The memory comprises two parts, generally known as the Control Memory 22 and the Addressable Memory Section 24, also referred to as Main Memory. The Control Memory 22 is made up of 128 36-bit integrated circuit registers for this embodiment. Each of these registers has a cycle time of 125 nanoseconds. The Main Memory 24 is comprised of high speed toroid ferrite cores whose read/write time is 750 nanoseconds. The Main Memory is arranged with each storage location or register capable of storing 36-bits and being arbitrarily accessible. As indicated above, the Control Memory 22 is comprised of a plurality of integrated circuit registers. For this embodiment, 128 registers are utilized, and each register has a word size of 36-bits. The Control Memory performs a storage function which is relative to this subject invention and will be described below. The A-Registers in the Control Memory 22 are utilized in the implementation of the subject invention. The octal (numerical base 8) addressing of control memory is from addresses 00000 to $00200_8$. The operand addressing system of the subject invention does not operate to address the Control Memory 22 in the base relative addressing mode. The addressing system for Main Memory 24 is described in copending application of J. P. Ashbaugh et al., Ser. No. 493,180, entitled Signal Responsive Apparatus, filed Oct. 5, 1965, and assigned to the assignee of the subject invention.

The Control Section of the computer is shown illustrated within dashed block 26. It is the function of the Control Section to guide and control the entire computer system and provides the control pulses for the proper sequential execution of the stored program. A detailed description of the entire workings of the Control Section 26 would not add appreciably to the understanding of the subject invention; hence, the Control Section 26 will be described generally. The Control Section contains four major subsections which are (1) the Program Address Subsection 28; (2) the Program Control Subsection (PC) 30; (3) the Storage Class Control Subsection (SCC) 32; and, (4) the Index Subsection 34. The Control Section also includes the circuits which supply the control signals necessary to synchronize execution of the instructions, as indicated by the portion designated Timing and labeled 36. The address of the instruction to be executed is stored in the Program Address Subsection 28. This address is increased by 1 each time an instruction word is processed. This incrementation is accomplished automatically by the index added which is in the Index Subsection 34. Each instruction word is then transferred in successive order to the Program Control Subsection 30, which contains an Instruction Register 31, for decoding and translation. This translation detemines the computer operation to be performed. In most instruction words, a *u*-field references an address in memory, such as in core Main Memory 24 or the Control Memory 22. The instruction format will be discussed in more detail below. The *u*-field may or may not be modified to form the effective operand address designated as U, depending upon the instruction word. All transfers from the Program Control Subsection 30 to the storage addresing circuitry are made through the Index Subsection 34 wherein any designated address modification is accomplished. As mentioned briefly above, the Program Address Subsection 28 includes a P-Register 38 which stores the address of the next instruction. For this embodiment the P-Register 38 is an 18-bit register. The contents of the P-Register are increased (P+1) at a particular point in each instruction cycle. Thus, the computer has means by which it can initiate and govern the sequential execution of the program instruction word. When the instruction sequence is to altered by jump or branch instructions, the address which replaces the current contents of the P-Register 38, is the address to which the program control is being transferred. As is well-known in the art, there are a large variety of binary registers which can be used for the purposes of storing data words. Preferably each stage of the register is a transistorized bistable flip-flop which provides an output signal indicating the storage state of the stage, that is whether the stage is in the "0" state or the "1" state. The P-Register 38 and all other registers mentioned herein are contemplated as being of this type or their equivalents. The Storage Class Control Subsection 32 decodes the effective operand address U, of an instruction for subsequent absolute address referencing to the Control Memory 22 or the Main Memory 24. The base relative addressing takes place within the Storage Class Control Subsection 32 and is described in the co-pending application identified above. Descriptive terms utilized herein will refer to items such as data words, operands, instructions, addresses, and bits. It is understood that these terms are to be used as being equivalent of the signal representations that are actually used in the computer device to indicate these various items. In other words, when referring to the operands being stored in the memory section of thte computer, it is understood that each stage in the memory register actually contains a signal representation or a magnetic remanent state indicative of the corresponding bit of the operand. Since only two different signal representations are required for binary numbers, it is common practice to have the signal representations in the form of two different voltage levels, a first level indicating a "1" and a second level being indicative of "0." When numerical examples are presented, decimal numbers will be provided without subscript. When binary or octal numerical representations are set forth, a subscript 2 or 8 will be utilized, thereby precluding confusion as to what number base is being discussed.

To summarize, the computer illustrated in FIGURE 1 performs all its internal operations in the parallel binary mode. Each computer word and Control Memory 22 and in Main Memory 24 contains 36-bits. These 36-bits may constitute any one of the computer word types, for example, instruction word or data words or constants. Instruction word is divided into parts called designators (to be described below). They specify the function to be performed, in the address of the operand, specify the arithmetic registers, specify indexing if desired, incrementation or decrementation, and specify indirect addressing if desired. As the current instruction is being performed, the program address register (P-Register 38) will address and will initiate the translation of the next instruction to be performed. Therefore, it can be seen, that two instruction words can be in operation at any given instant. The instruction or data can be in either the Control Memory 22 or the Main Memory 24. Input and output operations are done independently of the main program. They are controlled by the I/O access control words stored in the Control Memory 24. The I/O data flow between the Main Memory 24 and the peripheral equipments (not shown) through the Input/Output Section 20.

FIGURE 2 illustrates the format of the instruction word for the embodiment of the computer which incorporates the subject invention. The instruction word utilizes 36-bits organized into several distinct parts or designators. The various portions and designators will be discussed in order starting from the left and proceeding to the right-most end of the instruction word. The *f*-portion represents the function code or the command operation to be performed by the computer. Illustratively the *f*-portion may hold the bit combination for dictating that the computer should perform an add operation, a subtract operation, a jump operation, a floating-point conversion, etc. Six-bits are the normal function code configuration; however for certain operations the *j*-field is also combined as part of the function code. This expands the capacity to distinguish between the specific operations. The *j*-field is 4-bits, and it utilizes as the partial-word-transfer designator. In its normal operation the *j*-field determines whether an entire data word or only a specified part of a data word is to be transferred to or from the Arithmetic Section. As previously mentioned, in certain instruction, the *j*-field serves as an additional part of the function code designator. Such is the case for the subject conversion instructions. When the *j*-field is utilized in its normal function, it specifies which half-word, third-word, or sixth-word is to be used. When reading from the Memory Section, the transfer is always into the least significant position of the register in the Arithmetic Section. In transfers from the Arithmetic Section, the *j*-field specifies to which word, half-word, third-word, or sixth-word, the least significant portions of the Arithmetic Section will be transferred. Bit positions within the U which are not involved in the transfer are not changed. Various combinations of sign extension or lack of the *j*-field, the *u*-field of the instruction becomes the effective operand rather than the address of the operand as is the normal case. The *a*-field is 4-bits and is termed the *a*-Register designator. For normal operations, the *a*-field specifies one of sixteen possible A-Registers and in some special cases it can also specify one of the sixteen B-Registers or sixteen R-Registers. These special registers are addressable locations in Control Memory 22. Other operations concerned with the *a*-field are not relevant to the subject invention and will not be described. The *b*-field is 4-bits and is used to reference any one of the fifteen index registers that are contained in the integrated circuit registers of the Control Memory 22, when the modification of the *u*-field is specified. The index registers are referred to as B-Registers, and their modification of the *u*-field is often referred to a B-boxing or indexing. When the *b*-field is set to zero, modification to the *u*-field will not take place. If the *b*-designator is coded with a numerical value from $1_8$ through $17_8$ the coresponding B-Register is referenced and its contents are added to the $u$-field to form the effective address U. This discussion has not taken into account the base relative addressing operation. The $h$-field is 1-bit and is termed the incrementation designator.

The computer which incorporates the subject invention has the option in each instruction of calling for modification to the B-Register specified by the $b$-field. This modification which takes place after the operation of combining the $u$-field of the contents of the specified index register (B-Register) occurs during the instruction execution at no expense in time. The control alteration of the B-Register modification, the $h$-bit is operative when set to 0 to not increase the lower half of the B-Register, and if $h$- is set equal to 1, to add the upper half of the B-Register to the lower half of the same register and store the sum back in the lower half. The $i$-field is 1-bit and is termed the indirect addressing indicator. The use of indirect addressing permits the entire address field ($u$-field) of the instruction along with the $b$-, $h$-, and $i$-fields to be replaced before the instruction is executed. That is, the effective address U, is not the address of the operand but is the address of an address. The $i$-field functions such that when it is set to 1, the instruction functions normally, and when set to 1, the lower 22-bits comprised of $b$-, $h$-, $i$-, and $u$-fields of the instruction are replaced with the lower 22-bits of the contents of the storage register designated in the instruction. This indirect addressing may be continued, or cascaded, to any level during the execution of any one instruction with full indexing capabilities at each level. The indirect address will be continued until such time as an instruction word results having the $i$-field equal to 0. The $u$-field is termed the address field, and for this invention, is of the most interest. For most instructions, these 16-bits are used for addressing the memory, either Main Memory 24 or Control Memory 22. Some of the possible instructions of the computer use this field for holding constants or for containing shift counts. It will be recalled that it was specified above that the indexing register (B-Registers) are comprised of 18-bits. The additive combination of a B-Register of 18-bits and the $u$-field of 16-bits provides adequate address capabilities to directly address a memory having 131,000 independent storage locations. To illustrate the function of the various instruction word designators, assume an arithmetic instruction, stored at the address contained in the P-Register 38 is to be executed. Assume further that the instructions are stored in one portion of Main Memory 24 and that the data is stored in the other portion of Memory 24. Once the arithmetic instruction has been read into the Program Control Subsection 30, the following events take place:

(1) The $f$-, $j$-, and $a$-designators are interpreted by the control circuitry and the appropriate circuitry for performing the arithmetic instruction is alerted.

(2) The lower half of the instruction ($h$-, $i$-, and $u$-designators) is transferred from Program Control Subsection 30 to the Index Subsection 34.

(3) The $b$-designator is tested to determine which index (B-Register), if any, is to control address modification.

(4) If modification is stipulated (the $f$-field exceeds 0) the lower half of the contents of the specified index register (B-Register) is transferred to the adder in the Index Subsection 34.

(5) The $u$-field with two binary zeros placed to the immediate left thereof, are transferred to the index adder in the Index Subsection 34 where modification takes place by adding the 18-bit B-Register portion and the 18-bit $u$-designator portion by a 1's complement addition.

(6) After the index modification takes place, the address is tested to see if any of the following conditions exist (a) $u$-field greater than $200_8$ and $i$- equals 0; (b) $f$- is a specified operation not relevant to this operation; or (c) the effective address U is a shift count. If any of these conditions exist, operation continues on immediately to step 7. In the event the foregoing conditions do not exist, the base relative addressing operation takes place to form the effective absolute memory address U.

(7) After the absolute address U is determined, the address is transferred from the index adder in the Index Subsection 34 to the Storage Class Control Subsection 32 where it is decoded for subsequent reference of the Main Memory 24.

(8) The $i$-field is tested to determine whether direct or indirect addressing is stipulated.

(9) When modification is specified, the $h$-designator in the current instruction is tested to determine whether the index register modifier is to be increased or decreased.

(10) After incrementation, the new modifier is sent into the lower half of the index register specified by the $b$-field. The increment remains unchanged.

(11) The operand address is transferred from the Storage Class Control Subsection 32 to the appropriate memory module address selector.

(12) The entire 36-bit content of the storage location specified by the memory module address selector are transferred into an appropriate register associated with each memory unit.

(13) The contents of the A-Register specified in the current instruction are transferred from the A-Registers to an arithmetic X-Register 19.

(14) The actual data transfer is in accordance with the $j$-designator interpreted in step 1, and is made the Main Memory 24 to the Arithmetic Section 10.

(15) The Program Address Subsection 28 has the P-Register 38 increased by one to provide for the sequential execution of the next instruction.

(16) The next instruction, stored at the address now contained in the P-Register 38 is referenced in Memory 24.

(17) The circuitry alerted by the $f$-designator in step 1 performs the desired arithmetic operation.

(18) The next instruction, referenced in step 15, is sent to the Program Control Subsection 30.

The foregoing general system of instruction execution is somewhat modified for the subject conversion instructions. These differences will be illustrated below.

Any number can be expressed as a product of some numerical value multiplied times the predetermined numerical base of the system raised to a predetermined power. For example, the number 24 can be expressed with the numerical base 2 with any of the following arrangements:

*Example I* number
characteristic
mantissa $$2^4 \times 1.5 = 16 \times 1.5 = 24$$
$$2^3 \times 3.0 = 8 \times 3 = 24$$
$$2^2 \times 6.0 = 6 \times 4 = 24$$

Note, since the numerical base 2 is used, the doubling of the mantissa (1.5 to 3 to 6), is compensated for by a reduction in the characteristic from 4 to 3 to 2. In a binary computer, this doubling (or halving) of a value can be done efficiently by a shifting of a number right or left.

Arithmetic operations involving two numbers expressed in the notation tabulated above, are simple provided that the characteristics are the same. With addition, for example, the mantissas are added and the characteristics remain the same. The base, once established, remains fixed. A simple addition is illustrated in Example II as follows:

*Example II*

$$(2^3\times3)+(2^3\times4)=2^3\times7=8\times7=56$$
$$(8\times3)+(8\times4)=8\times7=56$$
$$(24)+(32)=56$$

When the exponents are different, an operation of this sort can be executed once either of the characteristics are modified so that they become equal. Example III is provided to illustrate such situation.

*Example III*

$$(.3\times2^3)+(.4\times2^2)=4.0$$

can be set forth as either of the following:

$$(.6\times2^2)+(.4\times2^2)=1.0\times2^2=4.0$$

or $$(.3\times2^3)+(.2\times2^3)=0.5\times2^3=4.0$$

The application of the foregoing methods of adjusting the characteristic and the mantissa for representing a given desired value is called floating-point, and the foregoing examples illustrate the inter-relationship of adjustment of the characteristic and mantissa for purposes of performing arithmetic operations.

In the computer illustrated and described in FIGURE 1, a positive mantissa, that is the numeral value of the data, is always considered to be a fraction. This is, when normalized the leading bit of the mantissa is equal to 1 and the value of a positive mantissa will always fall between 1 and ½ inclusive. A negative mantissa is normalized when the leading bit of the mantissa is equal to 0, and the value of a negative mantissa will always fall between the values of 1 and ½ inclusive. As mentioned above, the arithmetic system is capable of operating on two forms of floating-point operands, that is, single-precision and double-precision. Single-precision instructions produce double-precision results, i.e., an operand of twice the capacity of the standard arithmetic section register length. Double-precision arithmetic instructions also produce double-precision or double-length results. FIGURE 3 illustrates the format of the single-precision operand for the embodiment of the subject invention. The single-precision mantissa S–M is 27-bits and is stored in register bit positions 0 through 26. The single-precision characteristic S–C is 8-bits and resides in a storage register stages 27 through 34. The sign bit S resides in bit position 35. The mantissa S–M is the numerical value of the data and, as stated above, is always considered to be a fraction. It should be noted that the characteristic S–C is not the exponent of the mantissa; but, instead, is the exponent of the numerical base. The single-precision operand is shown with relationship to the A0-Register for illustrative purposes only, since that register is designated as the initial storage location in the conversion process for a single-precision to a double-precision operand. FIGURE 4 illustrates the format of a double-precision operand. It will be noted that two full registers X0 and X1 are utilized to store the double-precision operand. Recalling from above that a single-precision operand is illustratively shown as 36-bits, the double precision operand requires 72-bits to completely define it. Again, the X0- and X1-Registers are utilized for illustrative purposes since in the discussion below of the embodiment of the conversion apparatus of the subject invention the portions of the double-precision operand are initially stored in registers thus designated. The least significant portion of the double-precision mantissa D–M is stored in the 36-bits which are designated as the X1–Register. The most significant portion of double-precision mantissa D–M are stored in the lower ordered 24-bit positions of the designated X0-Register. The composite portion of the X0-Register and the entire X1-Register results in a 60-bit double-precision mantissa. The double-precision characteristic D–C is 11-bits in capacity and resides in bit positions 24 through 34 of the X0-Register. In the double-length operand notation, this is equivalent to bit positions 60 through 70. The sign of the mantissa S is located in the highest numbered bit position of the X0-Register. This is bit position 35 of the X0-Register, and is bit position 71 of the overall double-precision floating-point operand.

Both the characteristic and mantissa for floating-point arithmetic operations, whether they be single- or double-precision, may represent positive or negative values. The sign bit S denotes the sign of the mantissa, and will be described in more detail below. To avoid using two separate signs, that is, one for the characteristic and one for the mantissa, within the same word, a system of characteristic biasing is employed to indicate the sign of the characteristic.

For single-precision, this consists of adding to the true or unbiased characteristic the bias value of 128 ($200_8$). The 8-bit characteristic permits a range of −128 to +127 ($-200_8$ to $+177_8$) as shown in Table I.

TABLE I.—SINGLE-PRECISION

[Characteristic Values]

| Decimal | | Octal | |
|---|---|---|---|
| True | Biased | True | Biased |
| −128 | 000 | −200 | $000_8$ |
| 000 | 128 | 000 | $200_8$ |
| +127 | 225 | 177 | $377_8$ |

To illustrate the principles involved, the value $.75_{10}\times2^3$ is presented with every possible combination of signs.

Single-Precision:

| | | | |
|---|---|---|---|
| (1) | $.75\times2^3$ | $.75\times2^3$ (unbiased) | = 003 600 000 $000_8$ |
| | | Bias | = 200 |
| | | $.75\times2^3$ | = 203 600 000 $000_8$ |
| (2) | $-.75\times2^3$ | $.75\times2^3$ (unbiased) | = 003 600 000 $000_8$ |
| | | Bias | = 200 |
| | | $.75\times2^3$ | 203 600 000 $000_8$ |
| | | 1's Complement $-.75\times2^3$ | 574 177 777 $777_8$ |
| (3) | $.75\times2^{-3}$ | $.75\times2^{-3}$ (unbiased) | = (−3) 600 000 $000_8$ |
| | | Bias | 200 |
| | | $.75\times2^{-3}$ | 175 600 000 $000_8$ |
| (4) | $-.75\times2^{-3}$ | $.75\times2^{-3}$ (unbiased) | = (−3) 600 000 $000_8$ |
| | | Bias | 200 |
| | | | 175 600 000 $000_8$ |
| | | 1's Complement $-.75\times2^3$ | 602 177 777 777 |

For double-precision, the true or unbiased characteristic is adder to a bias value of 1024, $2000_8$. The 11-bit characteristic permits range of values shown in Table II.

TABLE II.—DOUBLE-PRECISION

[Characteristic values]

| Decimal | | Octal | |
|---|---|---|---|
| True | Biased | True | Biased |
| −1024 | 0000 | −2000 | $0000_8$ |
| 0000 | 1024 | 0000 | $2000_8$ |
| +1023 | 2047 | 1777 | $3777_8$ |

Double-Precision:

| | | | |
|---|---|---|---|
| | | 1's Complement | |
| (1) | $.75\times2^3$ | $.75\times2^3$ (unbiased) | = 0003 60 000 000 000 000 000 $000_8$ |
| | | Bias | = 2000 |
| | | $.75\times2^3$ | = 2003 60 000 000 000 000 000 $000_8$ |
| (2) | $-.75\times2^3$ | $.75\times2^3$ (unbiased) | = 0003 60 000 000 000 000 000 $000_8$ |
| | | Bias | = 2000 |
| | | $.75\times2^3$ | = 2003 60 000 000 000 000 000 $000_8$ |
| | | 1's Complement $-.75\times2^3$ | = 5774 17 777 777 777 777 777 $777_8$ |
| (3) | $.75\times2^{-3}$ | $.75\times2^{-3}$ (unbiased) | = (−3) 60 000 000 000 000 000 $000_8$ |
| | | Bias | = 2000 |
| | | $.75\times2^{-3}$ | = 1775 60 000 000 000 000 000 $000_8$ |
| (4) | $-.75\times2^{-3}$ | $.75\times2^{-3}$ (unbiased) | = (−3) 60 000 000 000 000 000 $000_8$ |
| | | Bias | = 2000 |
| | | $.75\times2^{-3}$ | = 1775 60 000 000 000 000 000 $000_8$ |
| | | 1's Complement $-.75\times2^{-3}$ | = 6002 17 777 777 777 777 777 $777_8$ |

The foregoing illustrated biasing of the single-precision and double-precision characteristics allows negative or positive excursions from the medium bias value. This biasing system permits the direct addition or subtraction of the mantissa and characteristics of two floating-point operands and permits the negative of a given positive value to be formed by calculating the 1's Complement value for the positive operand. Referring briefly to FIGURES 3 and 4 again, it will be seen that whenever bit position 34 for the single-precision characteristic or bit position 70 for the double-precision characteristic contain a binary one, the characteristic value is positive. When bit positions 34 for S–C and 70 for D–C are zero, the respective characteristics are a negative value.

Concerning the sign of the mantissa, a positive valued mantissa is represented by a 0 in the sign bit position with the exact numerical value of the data represented by either S–M or D–M. For negative mantissas, the representation is only slightly more complicated. A negative mantissa is represented according to the following rules:

(1) Represent the mantissa as a positive value with no regard to the sign;

(2) Represent the characteristic according to the rules set forth above; and (3) From the 1's complement of the entire floating-point word whether it be single-precision or double-precision.

When the foregoing procedure is followed, the sign bit for either the single- or the double-precision floating-point operand will automatically become a 1 value for this embodiment.

Briefly stated, conversion from single- to double-precision format for a floating-point operand consists of shifting the single-precision mantissa (bits 0 through 26) so that it occupies bits 33 through 59 of the double-length mantissa, which is comprised of bits 23 through 0 of the X0-Register and bits 35 through 33 of the X1-Register; adjusting the bias and shifting the single-precision characteristic (bits 27 through 34) to occupy bits 60 through 70 (bits 24 through 34 of a 0-Register) in the double-precision word. The conventions set forth above for distinguishing the negative and positive characteristics and mantissas make the conversion more complicated in the actual system than the foregoing would imply. FIGURE 5 illustrates the overall nature of the single to double-precision floating-point conversion, alternatively referred to as S to D conversion. This discussion assumes that a single-precision floating-point operand is stored in the X0-Register 50 having a sign bit (S) 52, a single-precision characteristic S–C 54, and a single-precision mantissa S–M 56. The 9-bits comprising the sign 52 and the S–C 54 are directed along path 58 to the lowest ordered input terminals of a 12-bit Characteristic Adder 60. The sign bit 52 determines whether the true value of S–C is transmitted or whether the complement of S–C is transmitted. For this embodiment, the bias for a single-precision characteristic is $200_8$ and the bias of a double-precision characteristic is $2000_8$. Accordingly, the Characteristic Adder 60 is provided with an input constant value of $1600_8$ so that S–C is biased to the level of the double-precision characteristic system. The double-precision characteristic D–C thus generated by the Characteristic Adder 60 is transmitted via path 62 into the portion of the A0-Register 64 set aside for the storage of the double-precision characteristic. In this embodiment, the characteristic is stored in bit position 60 through 70 of the total double-precision operand, which are bit positions 24 through 34 of the A0-Register 64, designated as portion 66. The sign bit 52 is carried forward into the sign of the double-precision floating-point operand 68. If S–C 54 is negative, the complement value is processed through the Characteristic Adder 60. Accordingly, it is necessary to re-determine the negative value by complementing the sum provided at the output of the Characteristic Adder. This is again controlled by the value of sign bit 52. The single-precision mantissa S–M 56 is shifted as indicated by path 70 and transmitted into bits 33 through 59 of the double-precision floating-point operand. This means that the lowest ordered three bits of S–M reside in the higher ordered 3-bits (33 through 35) of the A2-Register 74, and the higher ordered portion of S–M is shifted into bits 0 through 23 of the A0-Register 64, and designated as 76. The remainder of the double-precision floating-point mantissa is sign filled via path 78. Accordingly, the lower ordered portion 80 of the A2-Register 74 is filled with the value expressed by sign bit 52. For the foregoing, timing and control have been eliminated from consideration to clearly set forth the nature of the conversion technique. Such control will be defined and illustrated more fully below. The same holds true for the consideration of the double-precision floating-point conversion to single-precision floating-point. The steps for the conversion from single-precision to double-precision floating-point may be set forth as follows:

(1) Transfer X0-bits 27 through 35 to Characteristic Adder 60 with the 8-bit characteristic plus the sign automatically shifted to the lowest order input portion of the Adder;

(2) If the mantissa 56 is negative as indicated by sign 52, complement X0-bits 27 through 35, and if the single-precision mantissa is positive, omit this step;

(3) Add $1600_8$ to alter the biasing of the single-precision characteristic 54 to the same bias level as that of the double-precision characteristic level;

(4) If single-precision mantissa 56 is negative as indicated by sign 52, complement the output sum of Adder 60, and if the mantissa 56 is positive, omit this step;

(5) Send to A0-bits 35 through 24 the resultant sum from the Characteristic Adder 60;

(6) Shift X0-Register bits 3 through 26 into A0-Register bit positions 0 through 23 and shift X0-Register bits 0 through 2 into A2-Register bit positions 33 through 35 respectively; and (7) Fill A2-Register bit positions 0 through 32 with the value of the sign bit 52.

It is apparent that any single-precision characteristic can be expanded into a corresponding double-precision characteristic due to the increase in numerical capacity of the portion of the double-precision floating-point operand set aside for representing the double-precision characteristic.

FIGURE 6 illustrates graphically the compaction and conversion technique for converting a double-precision floating-point operand into a single-precision floating-point operand, alternatively referred to as D to S conversion. Similar circuitry is utilized in the D to S conversion. To avoid confusion, though the same registers are utilized, now reference numerals will be used in the D to S conversion. The steps in the D to S conversion may be set forth as follows:

(1) Transfer the double-precision characteristic D–C 81 and the double-precision sign 82 (X0-Register bit positions 24 through 35 respectively) along path 83 to the Characteristic Adder 60;

(2) If the double-precision mantissa D–M 84 is negative as indicated by sign 82, complement the sign 82 and D–C 81 and transmit the complemented value to the Characteristic Adder 60; and, if D–M is positive, omit this step;

(3) Subtract $1600_8$ via the Characteristic Adder 60 to adjust the bias of the converted characteristic to the single-precision bias value of $200_8$;

(4) Check the overflow when the converted characteristic cannot be represented in 8 binary bits required for the single-precision floating-point characteristic format; and check for underflow when the converted value for the single-precision characteristic is beyond the negative bias value for the single-precision characteristic range (this will be described in more detail below), and generate a fault condition when either an overflow or underflow condition exists;

(5) If D–M 84 is negative as determined by sign bit 82, complement the difference provided by the Characteristic Adder 60, and if D–M is positive, omit this step;

(6) Direct the lower 8-bit portion of the output Characteristic Adder 60 and the sign bit along path 86 to the A0-Register 64 in bit positions 35 through 27;

(7) Shift the higher ordered portion of the double-precision floating-point mantissa 84 (bits 59 through 36) into the single-precision mantissa portion 88 of the A0-Register at bit positions 26 through 3 respectively. The higher 3 ordered digits 90 of the X1-Register are directed to the lowest 3 ordered bit positions of the A0-Register. The lower ordered portion of the X1-Register 92 being X1-Register stages 0 through 32, are dropped.

It will be recalled from above that a total range for single-precision floating-point characteristics is $400_8$ and that the total range for a double-precision floating-point operand characteristic is $4000_8$. It can be seen therefore, that the programmer when utilizing the D to S conversion instruction he must assure himself that the double-precision floating-point characteristic is within a range which can be accommodated in the single-precision characteristic format. Table III illustrates the double-precision characteristic range of true values from $-2000_8$ through $+1777_8$, and the single-precision characteristic range from $-200_8$ through $177_8$. The bracketed portion in the D–C range of $-200_8$ through $+177_8$ can be converted to single-precision floating point format. The double-precision floating-point characteristics have a true numerical value greater than $177_8$ will cause an overflow fault to be generated should an attempt to convert it to a single-precision floating-point characteristic. Similarly, a double-precision floating-point characteristic on the lower extremity of the range cannot be converted and will cause an underflow fault to be generated should such a characteristic in that range be entered into the conversion apparatus.

TABLE III

| | D–C Range (True) | S–C Range (True) |
|---|---|---|
| $+1777_8$ | Overflow→for D→S | |
| $+0177_8$<br>$0000_8$<br>$-200_8$ | D→S Converts | S→D Converts { $+177_8$, $000_8$, $-200_8$ |
| $-2000_8$ | Underflow for D→S | |

The instruction format and instruction code designation along with the summary of the operation for a Floating-Point Expand and Load instruction is illustrated in Table IV.

TABLE IV.—FLOATING EXPAND AND LOAD (FEL) (SINGLE-PRECISION TO DOUBLE-PRECISION)

| Instruction Code | | Mnemonic | Operation |
|---|---|---|---|
| f | j | | |
| 76 | 16 | FEL | Single-precision floating-point (U) Sign, 8-bit characteristic 27-bit mantissa { Sign, 11-bit characteristic 60-bit mantissa at a and a+ |

This instruction expands a single-precision floating-point operand stored at an address U, as determined by the *u*-field as modified by the *b*-field and relative addressing if utilized, into a double-precision floating point word which is directed to Control Memory 22 *a*-Registers *a* and *a*+1, where the initial *a*-Register is specified in the *a*-field of the instruction word. The following example will illustrate a single precision floating-point convention to a double-precision floating-point operand.

Example:
531 305 712 $345_8$=(U)
Step 1: Unpack Characteristic
Complement when mantissa is negative
$(531)^1=246_8$
$-200_8$ bias of single-precision
———
$46_8$ single-precision unbias characteristic
Step 2: Unpack Operands and Shift A0- and A2-Registers Right
7773 057 123 45 777 777 777 $77_8$
(777 777 777 $77_8$: sign extension)
(a 3-binary-place shift equals 1 octal shift).
Step 3: Pack a- and a +1-Registers
$46_8$-Single-precision unbiased characteristic
$+2000_8$-Double-Precision Bias
———
$2046_8$-Characteristic
$5731_8$-(Complemented) negative mantissa
5731 30 571 $234_8$←→a-Register
577 777 777 $777_8$←→a+1-Register It will be noted in Step 1 that $200_8$ is subtracted and in Step 3 that $2000_8$ is added to perform the bias adjustment for the S to D conversion. In actuality this is accomplished in one step by adding $1600_8$ to the S–C.

The instruction code and a summary of the operation of the instruction for converting a double-precision floating-point operand to a single-precision floating-point operand is illustrated in Table V.

TABLE V.—FLOATING COMPRESS AND LOAD (FCL) (DOUBLE-PRECISION TO SINGLE-PRECISION)

| Instruction Code | | Mnemonic | Operation |
|---|---|---|---|
| f | j | | |
| 76 | 16 | FCL | Double-precision floating-point (U) and (U+1) Sign, 11-bit characteristic 60-bit mantissa { Sign, 8-bit characteristic 27-bit mantissa |

This instruction operates to compress a double-precision floating-point word stored at an address U and *U*+1, where U is determined from the *u*-field along with indexing and base relative addressing if any, as described above. The resultant single-precision floating-point operand will be stored in the *a*-Register designated in the *a*-field of the instruction. The following example will illustrate a conversion of the double-precision floating-point operand to a single-precision floating-point operand.

Example: U (573424 572 017) U+1 (324 567 765 432)
573424 572 017 324 567 765 $432x$=(U, U+1)
Step 1: Unpack Characteristic
Complement when mantissa is negative
$(5734_8)^1=2043_8$
$-2000_8$ double-precision bias
———
$43_8$ double-precision unbiased characteristic
Step 2: Unpack Operands and Shift $X_0X_1$ Left
7777 24 572 017 324 567 765 $432_8$=X0- and X1-Registers
7772 45 720 173 245 677 654 $320_8$
(245 677 654 $320_8$: Lost)
(a 3-binary-place shift equals 1 octal digit shift)
Step 3: Pack A
$43_8$=Double-precision unbiased characteristic
$+200_8$=Single-Precision Bias
———
$243_8$ Characteristic
$534_8$=(Complemented; negative mantissa)
534 245 720 173——→a-Register Again, it will be noted that in Step 1 $2000_8$ is subtracted and in Step 3 that $200_8$ is added. In this embodiment, the bias conversion is accomplished by subtracting $1600_8$ from D–C.

FIGURE 7 illustrates a simplified block diagram of the apparatus and information and control signal paths for performing the operations of the subject invention. This same apparatus, depending upon the selection signals provided as a result of the translation of the function code of the particular conversion instruction, operates to perform the complete conversion operation as described above. It will be assumed first that an instruction such as illustrated in Table IV has been caused to be loaded in the Instruction Register 31 for execution on a single-precision floating-point operand located at a particular address in the Memory 24. The Memory Addressing circuitry 98 calculates the address in Memory 24 to be accessed. It will be further assumed that the contents of the designated memory location U, as determined by Memory Addressing circuitry 98, have been transferred to the X0-Register 100. The single-precision operand has the sign in bit position 35, the characteristic S–C in bit positions 34 through 27, and the mantissa S–M in bit positions 26 through 0. The X0-Register 100 is shown divided in half with the alternative bit-capacities of the characteristic and mantissa both illustrated in the register in the same time. This is done merely for ease of description of both conversion operations. The timing periods illustrated below are intended only to show a sequence of control pulses and are not intended to show specific gate or clocking pulses. The timing sequence clearly illustrates the nature of the operation by showing the timing intervals, and it is not felt that a detailed presentation of specific timing pulses adds appreciably to the understanding or discussion of the embodiment of the invention. It is well within the skill of the logic designer to provide timing pulses as required to control the precise operations during the designated time intervals. The timing sequences indicate that the control section of the computer, in response to the translation of the function code portion of the instruction, will issue control pulses during the designated time intervals for guiding and controlling the translation and conversion process.

TIMING PERIODS

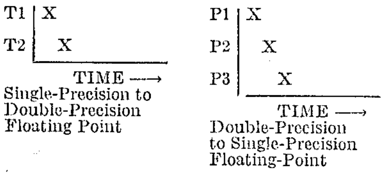

Since this example is an S to D conversion, the S–C portion of the X0-Register 100 is transmitted along with the sign bit along path 102 into the Characteristic Selector circuits 104. The sign bit S is directed along path 106 as a further control signal to the Characteristic Selector 104. During timing interval T1 a gating signal will be provided on conductor 108 to the Characteristic Selector circuits 104 for causing the appropriate transfer of the characteristic to be made from the Characteristic Selector circuitry 104 along path 110. It will be recalled that when the sign bit S is negative, the complement of the characteristic is utilized, and when the sign bit S is positive, the true value of the characteristic S–C is utilized. A timing pulse will be applied to the Bias and Selector circuitry 112 during the same time interval T1 via path 114. This will cause a constant value $1600_8$ to be provided along path 116 as the second parallel input to the Characteristic Adder circuitry 118. The characteristic adder forms the sum of the single-precision floating-point characteristic S–C and the selected bias constant and provides the resultant sum as an output along path 120 as input signals to the Converted Characteristic Selector circuitry 121. Having added the bias constant to the characteristic S–C, it is necessary to again utilize the sign S as a control signal on conductor 122 for selecting the appropriate converted characteristic. Again, it will be recalled that when the sign is negative it is necessary to complement the sum resulting from the Characteristic Adder 118, and when the sign is positive the sum from the characteristic adder is utilized in its true form. At this time, a full 12-bit characteristic D–C, including the sign bit has been generated and during timing period T2 a gating pulse will be applied to conductor 124 which will cause the D–C to be transmitted via path 126 to the A0-Register 128. The D–C segment is stored in bit positions 34 through 24 along with the sign bit in position 35. Recalling that this is an S–D conversion, the 27-bit single-precision mantissa S–M is provided along path 130 from bit positions 26 through 0 as an input to the Mantissa Selection and Shifting Network 132. This can be appropriately arranged gate circuitry or can be a shift matrix of a type well-known in the art. During timing interval T2, an enable pulse is provided via control line 134 to the Mantissa Selection and Shifting Network 132 for causing S–M to be shifted downward in signicance in the registers and be applied via path 136 as input signals to bit positions 23 through 0 of the A0-Register 128 and to bit positions 35 through 33 of the A2-Register 138 via path 140 respectively. The doube-precision floating-point mantissa is sign filled in the lower ordered portion of the A2-Register 138. This is accomplished by providing the sign bit S as an input via path 142 to a Sign Fill Gate 143 which is controlled during timing interval T2 by an enable pulse via path 144. When enabled, Sign Fill Gate 143 causes bit position 0 through 32 of the A2-Register 138 to be set to the value of the sign bit S in the X0-Register 100. This completes the S to D conversion and the double-precision operand stored collectively in the A0-Register 128 and the A2-Register 138 of the Arithmetic Section are then transferred to the $a$-Register and the $(a+1)$-Register in the Control Memory 22 where they are stored for further floating-point use. The $a$-Register is specified in the conversion instruction illustrated in Table IV.

Having described the circuit operation of the single-precision floating-point conversion to double-precision floating-point, it remains to be described the conversion of double-precision to a single-precision floating-point operand. Table V illustrates the format of this instruction and briefly defines the operation. The timing periods illustrated above are applicable to this discussion. Again, it will be assumed that the conversion instruction has been called into the Instruction Register 31 and has been translated to the point that the contents of the designated address in the instruction has been read from memory to the X0-Register 100 and the contents of the designated memory address $U+1$ has been read to the X1-Register 146. It will be recalled that this is accomplished automatically in the course of translation of the conversion instruction and as a result of the addressing system. Since this is a D to S conversion, the characteristic D–C occupies bit positions 24 through 34 of the X0-Register 100 and is applied along with the sign bit S via path 148 to the Characteristic Selection circuit 104. During timing interval P1 an enable pulse is provided on path 150 to enable the transfer of the appropriate D–C via path 110 into the Characteristic Adder 118. As above, the sign S is provided via path 106 to further control the selection of the particular form of the characteristic to be applied to the adder. For a D to S conversion, the constant $1600_8$ is to be subtracted; hence, a selection pulse is provided via path 152 during timing interval P1 to the Bias Selector Circuitry 112 where the constant bias $1600_8$ is complement and provided via path 116 as the other input to the Characteristic Adder 118. For a D to S conversion, the possibility of error arises in the form of an overflow or underflow as described above. For this reason, the Characteristic Adder 118 provides control circuitry for providing a signal via path 154 to the underflow and overflow Fault Indicating Circuitry 156. This fault is tested during timing interval P2 when a gating pulse is applied to the Fault Indicating Circuitry via path 158 and causes the Fault Indicating Circuitry to be set in the event that an overflow or underflow has been generated as a result of the adding operation. As a result of the addition, an 8-bit characteristic S–C has been generated and applied to the Converted Characteristic Selector 121 via path 120. This characteristic S–C is provided along path 160 to the A0-Register 120 in bit positions 27 through 34. This transfer is provided during timing interval P3, at which time a gate pulse is provided via path 162 as a control signal to the Converted Characteristic Selector circuitry 121. It is necessary to shift upward the double-precision mantissa from the X0-Register 100 and the X1-Register 146 for the final single-precision floating-point operand. This is accomplished by transferring a portion of the double-precision operand D–M illustrated as bit positions 23 through 00 of the X0-Register 100 and the bit positions 35 through 33 of the X1-Register 146 along path 164 into the Mantissa Selection and Shifting Network 132. During timing interval P3 a selection enable pulse is applied on path 166 to cause the single-precision mantissa S–M to be transferred along path 168 into the bit positions 27 through 00, respectively, of the A0-Register 128. The remainder of the double-precision mantissa is dropped. This completes the D to C conversion and the resultant single-precision floating-point operand is stored in the specified $a$-Register in the Control Memory 22 of the computer.

FIGURE 8 illustrates the arrangement of FIGURES 8$a$ through 8$d$, which collectively represents the logic block diagram of an embodiment of the subject invention. In this representation, logical AND circuits are designated as A, and logical OR circuits are designated as +. The AND and OR circuits are of the conventional diode arrangement. For the AND circuits to provide an output signal indicative of a logical 1, it is necessary that all input signals carry a value of 1. The OR circuits will provide an output signal indicative of logical 1 at its output terminal when any or all of their input terminals are supplied with a 1 signal. The registers are comprised of a plurality of bistable flip-flop circuits, preferably of the transistorized variety, which can be set to store a 1 or 0 value depending upon the signal applied to their input terminals. Each of the flip-flop circuits has a true and a complement output terminal respectively designated T and C. When a flip-flop circuit stores a 1 value, the T output terminal will provide a voltage level indicative of a 1 and the C output terminal will provide a voltage level indicative of a 0 or the complement of 1. Alternatively, when a flip-flop stores a 0, the T output terminal provides a voltage level indicative of a 0 and the C output terminal provides a complement voltage level and is indicative of a 1. Various arrangements of the foregoing logic circuits are well-known, and it is not deemed necessary to illustrate a precise example. For the following discussion, reference to particular bit positions will be made by Register name and stage number. For example, bit position 35 of the A0-Register will be termed A035, etc. To fully understand the operation of the conversion apparatus, examples will be carried through of a single-precision floating-point conversion to a double-precision floating-point operand and then a double-precision floating-point operand will be converted to a single-precision floating-point operand. At the outset it is assumed that an instruction has been loaded in the Instruction Register designating a conversion operation from single- to double-precision floating-point (see Table IV) and that a A0-Register 128 has been cleared to the 0 state. Further, it is assumed that the address specified in the instruction along with all indexing if any, has been accomplished and the single-precision floating-point operand has been loaded in the X0-Register 100. For the S to D conversion, the true output terminals of X0-Register 100 stages X035 through X027 are coupled into cable 200 and directed to the True S–C Gates 202. In a similar manner, the complement output terminals of each of the stages X035 through X027 are coupled into cable 204 and directed to the Complement S–C Gates 206. The complement output terminal C of the sign stage X035 is directed to True S–C Gates 202 via line 208 and operates to control the selection of the representation of the characteristic to be utilized. The true terminal T of the sign stage X035 is coupled via line 210 to the Complement S–C Gates 206 and in a similar manner operates to control the selection of the nature of the characteristic to be used. During timing interval T1, a control signal is applied via line 212 to the True S–C Gates 202 and the Complement S–C Gates 206 and operates in conjunction with the sign bit to perform the selection of the true or complement value of the single-precision floating point characteristic that is to be used. It will be recalled from above that when the sign of the mantissa is negative, the complement value of the characteristic is to be directed into the conversion apparatus. When the mantissa is negative, the sign stage X035 will store a 1 value which in turn is coupled via line 210 into the Complement S–C Gates 206. Therefore, it can be seen that all of the input terminals to the Complement S–C Gates will be enabled by 1 signals on the control line 212 and the sign control line 210 thereby gating the complement value of the characteristic through the Complement S–C Gates 206. Alternatively, if the mantissa is positive, the true value of the characteristic be utilized. When the characteristic is positive, the sign stage X035 will carry a 0 signal. The complement output terminal will carry a 1 signal under such a condition, and it will be seen that the C terminal is coupled via path 208 into the True S–C Gates 202. Therefore, when the control signal is applied on control line 212, the true value will be gated through the True S–C Gates 202. The output signals from the True S–C Gates are provided via cable 214 as one set of input signals to the S-to-D OR circuits 216, and the output signals from the respective complement S to C gates 206 are provided on cable 218 as the alternative input signals to the S-to-D OR circuits 216. The selected characteristic representation will be passed through the S-to-D OR circuits 216 onto cable 220 which in turn is directed as an input path to the characteristic operand OR gates 222. The other input signals to the Characteristic Operand OR circuits 222 which will be described below. The Bias Register 224 is comprised of ten flip-flop circuits and is utilized to store the bias constant $1600_8$. It will be recalled that $1600_8$ represents the difference in bias between the single-precision floating-point characteristic which is biased at $200_8$ and the double-precision floating-point characteristic which is biased at $2000_8$. Since the conversion being considered is S-to-D, it is necessary to add the bias constant value to the characteristic presented to the Characteristic Operand OR circuits 222. Each of the stages of the Bias Register 224 has the true output terminal coupled into cable 226 and directed to the S-to-D Bias Gates 228 Additionally the S-to-D bias Gates 228 receive a control pulse via path 230 during the time interval T1 from the control section (not shown). The control pulse operates to pass the constant $1600_8$ onto the output terminals of the S-to-D Bias Gates 228 which in turn are coupled into the cable 232 and directed to the Bias Operand OR circuits 234. The Bias Operand OR circuits pass the bias constant onto cable 236 and directs it as input signals to the lower ordered 10 stages of the Characteristic Adder 238. The characteristic adder can be any adder of types well-known in the art. Illustratively, the adder can be of a type described in the co-pending application of Gerald J. Erickson, entitled Segmented Arithmetic Device, Ser. No. 183,462, filed Mar. 29, 1962, and assigned to the assignee of the subject invention. This type of adder is illustrative only and should be understood that any adder which will meet the time requirements of a system to be utilized can be used as the Characteristic Adder 238. A parallel adder is recommended to achieve an optimum computational rate. The Characteristic Operand OR circuits 222 direct their output signals via cable 240 as the other input operand to the lower 9 stages of the Characteristic Adder 238. The Characteristic Adder operates to form the sum of the characteristic thus presented and the constant value presented from the Bias Register 224. A Characteristic Adder 238 is so arranged to provide a complement and true representation of each digit in the resultant sum. Each of the 12 true (T) output terminals are coupled into cable 242 and directed to the True Adder Gates 244. The True Adder Gates 244 are also provided with input terminals coupled to the complement output terminal of the sign stage X035 via line 246. Each of the 12 complement (*c*) output terminals from Characteristic Adder 238 are coupled into cable 248 and directed as input signals to Complement Adder Gates 250. The true output terminal of the sign stage X035 is coupled via wire 252 to each of the Complement Adder Gates 250. The operation of the True Adder Gates 244 and the Complement Adder Gates 250 in combination with the complement sign value and the true sign value respectively is to select either the true or the complement value provided from the Characteristic Adder 238 in accordance with the sign of the mantissa. When the sign of the mantissa is positive X035 will provide a 0 on the true output terminal which will disable the Complement Adder Gates 250. At this time, a 1 signal will be provided on the complement output terminal and fed via wire 246 as an enable to the True Adder Gates 244. This will cause the true value provided from the Characteristic Adder 238 to be gated through the True Adder Gates 244 onto cable 254. Alternatively, should the mantissa be negative, the true output terminal of X035 will provide a 1 signal via wire 252 as a control signal into the Complement Adder Gates 250. This will cause the Complement Adder Gates to be enabled and to pass the complement value of the sum provided from the Characteristic Adder 238 through the Complement Adder Gates 250 onto cable 256. The output terminals from the True Adder Gates 244 are coupled via cable 254 as a source of input signals to the Characteristic OR circuits 258 and the output terminal of the Complement Adder Gates 250 are coupled via cable 256 into the Characteristic OR circuits 258 for providing an alternate source of characteristic signals. The output terminals from the Characteristic OR circuits 258 are coupled into cable 260 and directed to the D-to-S Transfer Gates 262. The D-to-S Transfer Gates are enabled during time interval T2 by a control pulse received from the control section (not shown) via wire 264. The enabling of the D-to-S Transfer Gates 262 causes the characteristic generated to be transferred onto cable 266. Each conductor in cable 266 is respectively directed to a stage in the A0-Register 128. These stages in the A0-Register are A035 through A024. Having converted the single-precision characteristic to a double-precision characteristic it remains to be described the conversion of the single-precision mantissa to a double-precision mantissa. Stages X026 through X000 store the single-precision mantissa. Each of these stages has the true output terminal coupled into cable 268 and directed to the S-to-D Mantissa Gates 270. During timing interval T2 an enable signal is provided via line 272 to the S-to-D Mantissa Gates 270, and operates to gate the single-precision mantissa in a shifted form into the A0-Register 128 and the A2-Register 138, via cable 274. The shifting is such that the portion of the mantissas stored in X026 through X003 is shifted and directed to stages A023 through A000 respectively, and the portion of the mantissa stored in X002 through X000 is shifted into position in the A2-Register 138 in stages A235 through A233 via lines 274*a*, 274*b*, and 274*c* respectively. The true value of the sign bit stored in X035 is provided via line 276 as an input signal to the S-to-D Sign Fill Gate 278. During timing interval T2 an enable pulse is provided via line 280 to the S-to-D Sign Fill Gate 278 for causing the value of the sign to be transmitted via line 282 into the remainder of the A2-Register 138 stages (A232 through A200). This transmittal of the sign causes stages A232 through A200 to be set in the value of the sign of the mantissa. Having completed the conversion of the single-precision floating-point operand to a double-precision floating-point operand to a characteristic of a greater capacity, the value stored in arithmetic registers A0-Register 128 and A2-Register 138 are directed into the Control Memory 22 into the *a*-Register designated in the instruction and the designated $(a+1)$-Register.

To describe the detail arrangement utilized in the double-precision floating-point to a single-precision floating-point conversion it is assumed as described above that the A0-Register 128 and the A2-Register 138 have been cleared to store all 0's and that the double-precision floating point operand had been loaded into the X0-Register 100 and the X1-Register 146. For the D-to-S conversion, the characteristic D–C and the sign bit are represented in register stages X035 through X024. The true output terminals of each of these stages is coupled into cable 300 and into the True D–C Gates 302. The complement value of the sign, as stored in X035, is provided to each of the True D–C Gates via conductor 304. The complement value of each of the stages X035 through X024 are coupled into cable 306 and then into Complement D–C Gates 308. The true value of the sign, as stored in X035, is provided as a control input to each of the Complement D–C Gates 308 via control path 310. During timing control intervals P1, an enable signal is provided from the control circuitry (not shown) via path 312 to each of the Complement D–C Gates 308 and the True D–C Gates 302. These gates operate in a manner similar to the mode of operation described above for the True and Complement C–C Gates 202 and 206. When the sign of the mantissa is positive, the T output terminal of X–035 will provide a 0 signal and will disable the Complement D–C Gates 308. The C terminal will provide an enable signal to the True D–C Gates 302. Alternatively, when the sign of the mantissa is negative, the T output terminal X035 will provide a 1 signal via path 310 which will select the Complement D–C Gates 308 and disable the True D–C Gates 302. The True D–C Gates 302 provide output signals via cable 314 into the D-to-S OR circuits 316, and the Complement D–C Gates 308 provide output signals via cable 318 as input signals similarly arranged to the D-to-S OR circuit 316. Accordingly, whichever of the representations of the characteristic, whether it be the true or complement value, is applied to the D-to-S OR circuits 316, the appropriate one will be directed via cable 320 as input signals to the Characteristic Operand OR circuits 222, and the higher ordered three of D-to-S OR circuits 316 will provide output signals via lines 322, 324, and 326 respectively which will be directed to the higher ordered three adder stages of the Characteristic Adder 328. The Characteristic Operand OR circuits 222 will provide nine input signals via cable 240 into the lower ordered nine stages of the Characteristic Adder 238, thereby forming a full 12-bit input operand to the Characteristic Adder. For the D-to-S conversion, it is necessary to reduce the bias, hence an enable signal during timing interval P1 will be applied to line 328 as control input signals to the D-to-S Bias Gates 330. Additionally, the complement output terminals from the Bias Register 224 are provided via cable 332 as inputs to the D-to-S Bias Gates 330. This arrangement results in the complement of the value stored in the Bias Register 224 being gated through the D-to-S Bias Gate 330 onto cable 334, which is provided as an alternative source of input signals to the Bias Operand OR circuits 234. The Bias Operand circuits 234 in turn transmit the signals via cable 236 into the lower ten stages of the Characteristic Adder 238. As mentioned above, it is necessary to check during the D-to-S conversion for an overflow or underflow condition as a result of the addition performed in the Characteristic Adder 238. To accomplish the underflow check, it is necessary only to provide an output terminal coupled to line 336 from the end-around carry path. Since complement value of the constant stored in the Bias Register 224, is used, should an end-around carry result, it will indicate that the value to be calculated is less than the minimum biased value for the single-precision floating-point characteristic. In the event that a subtractive type adder is utilized as the Characteristic Adder 238, the same function can be accomplished by tapping the end-around borrow path from the adder circuit. These circuits are well-known in the art and need not be described in further detail. The end-around carry signal, should it occur, is provided as a signal to AND circuits 338. During the performance of the addition of the characteristic, it is also desirable to check for an overflow condition. This can be accomplished by coupling line 340, 342, 344 and 346 to the higher ordered four output stages at the true terminal of the Characteristic Adder 238. Such an arrangement will result in a signal being applied to one of these enumerated lines should carry into one of these digit positions being set to a 1 during the characteristic addition operation. Since a carry into one of these positions will be beyond the capacity of a single-precision floating-point characteristic an overflow fault must be generated. Lines 340, 342, 344 and 346 are directed as input lines to OR circuit 348 which in turn has an output terminal coupled via line 350 into AND circuit 352. During timing interval P2 an enable signal will be provided from the control section (not shown) via line 354 as a control input signal to AND circuits 338 and 352. Should a 1 signal be present on either line 336 or line 350 at this time, the "1" signal will be gated through the respectively AND circuit 338 or 352 along path 356 or 358 respectively into an indicator circuit for registering an underflow 360 or an overflow 362. These indicator circuits are illustrated as bistable flip-flops but may be any other type of indicator circuits such as a light circuit, or stop circuit, or any other desired means for indicating that the specified fault has occurred as the result of the operation of the Characteristic Adder 238. The output signals from the Characteristic Adder 238 are handled as described by the Complement Adder Gates 250 and the True Adder Gates 244 resulting in a characteristic selected by the Characteristics OR Circuit 258. The portion of the characteristic provided on the lower nine stages of Characteristic OR Circuits 258 are coupled into cable 364 and provide as input signals to the D-to-S Transfer Gates 366. Since this is a D-to-S conversion, during timing interval P3 an enable signal will be generated by the control circuit and applied via line 368 to control the transfer of the single-precision characteristic to cable 370. The single-precision characteristic on cable 370 is provided as a set of input signals in parallel to the stages of the A0-Register 128 designated as A035 through A027. To perform the conversion of a double-precision floating-point mantissa into a single-precision floating-point mantissa it is necessary to take the true output terminals of each of the X0-Register 100 stages X023 through X0000 into cable 372 and the true output terminals of the X1-Register 146 stages X135 via line 372*a*, X134 via line 372*b*, and X133 via line 372*c*, direct the signals as input signals to the respectively situated D-to-S Mantissa Gates 374. During timing interval P3 the control section will provide an enable pulse on path 376 to cause the mantissa signals to be directed onto cable 378 as input signals to the A0-Register 128. The individual conductors are so arranged that stages X023 through through X000 are respectively directed into A026 through A003 and stages X135 are respectively directed as input signals to A002 through A000. The remainder of the double-precision floating-point mantissa stored in X1-Register 146 is dropped as a result of this conversion operation. As previously described, the single-precision floating-point operand thus formed in the A0-Register 128 of the Arithmetic Section is subsequently transferred to the *a*-Register designated in the instruction word. This operation completes the conversion of the double-precision floating-point operand to single-precision floating-point operand.

The foregoing has intended to be illustrative of an embodiment of the subject invention and what is requested to be protected by Letters Patent is defined in the appended claims.

What is claimed:

1. A digital signal responsive apparatus for use in a floating-point arithmetic system for converting floating-point data words from one floating point format to another, said apparatus comprising: receiving means for receiving manifestations indicative of a floating-point data word to be converted, said receiving means including first means for receiving sign-indicating manifestations indicative of the arithmetic sign of the mantissa, second means for receiving manifestations indicative of floating-point mantissas for representing the numerical value of data words expressed in a first predetermined numerical capacity, third means for receiving manifestations indictative of floating-point characteristics for representing the power of the number base system expressed in a first predetermined numerical capacity; characteristic converting means responsively coupled to said first and third means for converting said characteristic manifestations expressed in said first numerical capacity to characteristic manifestations expressed in a second predetermined numerical capacity; and mantissa converting means responsively coupled to said second means for converting said mantissa manifestations expressed in said first numerical capacity to mantissa manifestations expressed in a second predetermined numerical capacity.

2. A circuit for use in a digital floating-point arithmetic system for converting the numerical range of floating-point operands, said circuit comprising: first means for storing a floating-point operand to be converted and having a plurality of output terminals for providing output manifestations indicative of the stored operand, said first means including a first portion for storing manifestations indicative of a floating-point mantissa expressed in a first predetermined numerical capacity, a second portion for storing manifestations indicative of a floating-point characteristic of said mantissa, said characteristic expressed in a first predetermined numerical capacity, a third portion for storing manifestations indicative of the arithmetic sign of said mantissa; characteristic selector means responsively coupled to said second and third portions for selecting the characteristic manifestations to be converted; bias means for providing manifestations indicative of a predetermined characteristic bias; adder means having a plurality of input terminals coupled to said characteristic selector means and to said bias means for providing a resultant sum of said input manifestations; converted characteristic selector means responsively coupled to said adder means and to said third portion for selecting the true value of said sum in response to a first of said sign manifestations and for selecting the complement value of said sum in response to a second of said sign manifestations and providing output signals indicative of the selected converted characteristic; mantissa selection and shifting means coupled to said first portion for converting said mantissa manifestations expressed in said first numerical capacity to mantissa manifestations expressed in a second predetermined numerical capacity; and second storage means responsively coupled to said converted characteristic selector means and to said mantissa selection and shifting means for at least temporarily storing said converted characteristic manifestations and said converted mantissa manifestations.

3. A circuit as in claim 2 wherein said first means for storing comprises: first and second input registers for receiving and storing floating-point operand manifestations, each of said input registers having a plurality of ordered bistable stages with true and complement output terminals; said first input register alternatively arranged for storing an entire single-precision floating-point operand and the most significant portion of a double-precision floating-point operand, and said second input register for storing the least significant portion of a double-precision floating-point operand.

4. A circuit as in claim 3 wherein said characteristic selector means comprises: a first predetermined number of first single-precision characteristic gating means having input terminals coupled to ones of the said true output terminals of first selected stages of said first input register and to the complement output terminal of the sign stage of said first input register; a first predetermined number of second single-precision characteristic gating means having input terminals coupled to ones of said complement output terminals of said first selected stages of said first input register and to the true output terminal of said sign stage of said first input register; a second predetermined number of first double-precision characteristic gating means having input terminals coupled to ones of said true output terminals of second selected stages of said first input register and to said complement output terminal of said sign stage of said first input register; a second predetermined number of second double-precision characteristic gating means having input terminals coupled to ones of said complement output terminals of said second selected stages and to said true output terminal of said sign stage of said first input register; first control means coupled to said first and second single-precision characteristic gating means for receiving first enable signals for converting from single-precision to double-precision floating-point; second control means coupled to said first and second double-precision characteristic gating means for receiving second enable signals for converting from double-precision to single-precision floating-point; final selection means coupled to first and second single-precision gating means and to said first and second double-precision gating means for providing manifestation indicative of the characteristic selected in response to the state of said sign and said first and second enable signals.

5. A circuit as in claim 4 wherein said first selected stages of said first input register are included in said second selected stages, and said second predetermined number is greater than said first predetermined number.

6. A circuit as in claim 4 wherein said final selection means includes a plurality of circuits for performing the logical OR operation in response to respective input signals.

7. A circuit as in claim 2 wherein said bias means includes a bias storage register having a plurality of ordered bistable stages, each of said stages having true and complement output terminals, said bias storage register adapted to store manifestations indicative of predetermined bias constant; first bias constant gating means coupled to respective ones of said bias register stage true output terminals; second bias constant gating means coupled to respective ones of said bias register stage complement output terminals; first bias control means coupled to said first bias constant gating means for receiving first enable signals when converting from single-precision to double-precision floating-point; second bias control means coupled to said second bias control gating means for receiving second enable signals when converting from double-precision to single-precision floating-point.

8. A circuit as in claim 3 wherein said adder means includes an end-around carry signal path, and has a true and complement output terminal for each digit of the resultant sum.

9. A circuit as in claim 8 and further including conversion fault detecting means coupled to said adder means.

10. A circuit as in claim 9 wherein said fault detecting means includes first circuit means coupled to a predetermined number of the highest ordered ones of said true output terminals of said adder means for detecting characteristic overflow conditions; first indicating means coupled to said first circuit means for indicating said overflow condition; second circuit means coupled to said end-around carry signal path for detecting characteristic underflow conditions; second indicating means coupled to said second circuit means for indicating said overflow condition; each of said first and second circuit means for detecting further including gating means having an input terminal adapted for receiving a control signal for enabling said first and second circuit means when converting from double-precision to single-precision floating-point capacities.

11. A circuit as in claim 8 wherein said converted characteristic selector means comprises: true adder gating means responsively coupled to said true output terminals of said adder means and to said complement output terminal of said sign stage of said first input register; complement adder gating means coupled to said complement output terminals of said adder means and to said true output terminal of said sign stage of said first input register; said true adder gating means and said complement adder gating means adapted for alternatively providing output signals indicative of the true value of said sum and the complement value of said sum in response to the arithmetic sign of said mantissa; a first predetermined number of double-precision characteristic transfer gating means coupled to said true and complement adder gating means for transferring double-precision cnaracteristics to a predetermined portion of said second storage means; a second predetermined number of single-precision characteristic transfer gating means for transferring single-precision characteristics to a predetermined portion of said second storage means, said second predetermined number being less than said first predetermined number.

12. A circuit for use in a digital floating-point arithmetic system for converting the numerical range of floating-point operand from single-precision to double-precision, said circuit comprising: first storage means for storing a single-precision floating-point operand to be converted and having a plurality of output terminals for providing output manifestations indicative of true and complement values of the stored operand, said first means including a first portion for storing manifestations indicative of a floating-point mantissa expressed in a first predetermined single-precision numerical capacity, a second portion for storing manifestations indicative of a single-precision floating-point characteristic of said mantissa, said characteristic expressed in a first predetermined numerical capacity, a third portion for storing manifestations indicative of the arithmetic sign of said mantissa; characteristic selector means responsively coupled to said second and third portions for alternatively selecting the true and complement characteristic manifestations to be converted; bias means for providing manifestations indicative of a predetermined characteristic bias value for raising the bias of said single-precision characteristic to a predetermined bias level for a double-precision characteristic; adder means having a plurality of input terminals coupled to said characteristic selector means and to said bias means for providing a resultant sum of said input manifestations; converted characteristic selector means responsively coupled to said adder means and to said third portion for selecting the true value of said sum in response to a first of said sign manifestations and for selecting the complement value of said sum in response to a second of said sign manifestations and providing output signals indicative of the selected converted characteristics; mantissa selection and shifting means coupled to said first portion for converting said single-precision mantissa manifestations expressed in said first numerical capacity to double-precision mantissa manifestations expressed in a second predetermined numerical capacity; and second storage means responsively coupled to said converted characteristic selector means and to said mantissa selection and shifting means for at least temporarily storing said converted characteristic manifestations and said converted mantissa manifestations.

13. A circuit as in claim 12 wherein said characteristic selector means comprises: a predetermined number of first single-precision characteristic gating means having input terminals coupled to ones of the said true output terminals of selected stages of said first storage means and to the complement output terminal of the sign portion of said first storage means; a like predetermined number of second single-precision characteristic gating means having input terminals coupled to ones of said complement output terminals of said selected stages of said first storage means and to the true output terminal of said sign portion of said first storage means; control means coupled to said first and second single-precision characteristic gating means for receiving first enable signals for converting from single-precision to double-precision floating-point; final selection means coupled to first and second single-precision gating means for providing manifestation indicative of the characteristic selected in response to the state of said sign and said first enable signals.

14. A circuit for use in a digital floating-point arithmetic system for converting the numerical range of double-precision floating-point operands to a predetermined single-precision floating-point format, said circuit comprising: first storage means for storing a double-precision floating-point operand to be converted and having a plurality of output terminals for providing output manifestations indicative of true and complement values of the stored operand, said first means including a first portion for storing manifestations indicative of a floating-point mantissa expressed in a first predetermined double-precision numerical capacity, a second portion for storing manifestations indicative of a double-precision floating-point characteristic of said mantissa, said characteristic expressed in a first predetermined numerical capacity, a third portion for storing manifestations indicative of the arithmetic sign of said mantissa; characteristic selector means responsively coupled to said second and third portions for alternatively selecting the true and complement characteristic manifestations to be converted; bias means for providing manifestations indicative of a predetermined characteristic bias value for reducing the bias of double-precision characteristics to a predetermined bias level for a single-precision characteristic; adder means having a plurality of input terminals coupled to said characteristic selector means and to said bias means for providing a resultant difference of said input manifestations, said adder including an end-around carry signal path; converted characteristic selector means responsively coupled to said adder means and to said third portion for selecting the true value of said difference in response to a first of said sign manifestations and for selecting the complement value of said difference in response to a second of said sign manifestations and providing output signals indicative of the selected converted single-precision characteristic; mantissa selection and shifting means coupled to said first portion for converting said double-precision mantissa manifestations expressed in said first numerical capacity to single-precision mantissa manifestations expressed in a second predetermined numerical capacity; and second storage means responsively coupled to said converted characteristic selector means and to said mantissa selection and shifting means for at least temporarily storing said converted characteristic manifestations and said converted mantissa manifestations.

15. A circuit as in claim 14 wherein said characteristic selector means comprises: a predetermined number of first double-precision characteristic gating means having input terminals coupled to ones of said true output terminals of selected stages of said first storage means and to said complement output terminal of said sign portion of said first storage means; a like predetermined number of second double-precision characteristic gating means having input terminals coupled to ones of said complement output terminals of said selected stages and to said true output terminal of said sign portion of said first storage means; control means coupled to said first and second double-precision characteristic gating means for receiving enable signals for converting from double-precision to single-precision floating-point; final selection means coupled to said first and second double-precision gating means for providing manifestation indicative of the single-precision characteristic selected in response to the state of said sign and said enable signals.

16. A circuit as in claim 14 and further including means having first circuit means coupled to predetermined number of the highest ordered ones of said true output terminals of said adder means for detecting characteristic overflow conditions; first indicating means coupled to said first circuit means for indicating said overflow condition; second circuit means coupled to said end-around carry signal path for detecting characteristic underflow conditions; second indicating means coupled to said second circuit means for indicating said overflow condition; each of said first and second circuit means for detecting further including gating means having an input terminal adapted for receiving a control signal for enabling said first and second circuit means.

References Cited

UNITED STATES PATENTS

| | | | |
|---|---|---|---|
| 3,043,509 | 7/1962 | Brown et al. | 235—156 |
| 3,244,864 | 4/1966 | Jones | 235—168 |
| 3,236,999 | 2/1966 | Hertz | 235—164 |
| 3,193,669 | 7/1965 | Voltin | 235—164 |
| 3,304,417 | 2/1967 | Hertz | 235—164 |

ROBERT C. BAILEY, *Primary Examiner.*

I. S. KAVRUKOV, *Assistant Examiner.*